(12) United States Patent
Sampei et al.

(10) Patent No.: US 12,513,278 B2
(45) Date of Patent: Dec. 30, 2025

(54) IMAGING APPARATUS, CONTROL METHOD OF IMAGING APPARATUS, AND NON-TRANSITORY COMPUTER READABLE MEDIUM

(71) Applicant: CANON KABUSHIKI KAISHA, Tokyo (JP)

(72) Inventors: Takahiro Sampei, Tokyo (JP); Takashi Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 18/616,503

(22) Filed: Mar. 26, 2024

(65) Prior Publication Data

US 2024/0357067 A1    Oct. 24, 2024

(30) Foreign Application Priority Data

Apr. 19, 2023    (JP) .................. 2023-068316

(51) Int. Cl.
*H04N 13/167*        (2018.01)
*H04N 13/00*         (2018.01)
(Continued)

(52) U.S. Cl.
CPC ......... *H04N 13/167* (2018.05); *H04N 13/239* (2018.05); *H04N 23/634* (2023.01); *H04N 2013/0096* (2013.01)

(58) Field of Classification Search
CPC .. H04N 13/167; H04N 13/239; H04N 23/634; H04N 2013/0096; H04N 13/296; H04N 13/218; H04N 13/00; H04N 13/10; H04N 13/106; H04N 13/111; H04N 13/183; H04N 13/207; H04N 13/361; H04N 2013/0074; H04N 2013/0081; H04N 2013/0085; H04N 2013/0088; H04N 23/63; H04N 23/631; H04N 23/632; H04N 23/633
(Continued)

(56) References Cited

U.S. PATENT DOCUMENTS 11,049,215 B2 * 6/2021 Takenaka .................. G06T 3/12
2005/0062869 A1 * 3/2005 Zimmermann .......... H04N 7/18
348/E7.071
(Continued)

FOREIGN PATENT DOCUMENTS

JP        2012-085252 A      4/2012

*Primary Examiner* — Albert H Cutler
(74) *Attorney, Agent, or Firm* — Venable LLP

(57) ABSTRACT

An imaging apparatus according to the present invention includes an image sensor, a processor, and a memory storing a program which, when executed by the processor, causes the imaging apparatus to acquire inclination information that is information of inclination of a dual-lens circular fish-eye lens unit with respect to the image sensor by analyzing a third image including a first circular fish-eye image area and a second circular fish-eye image area formed on the image sensor via two circular fish-eye lenses in the dual-lens circular fish-eye lens unit in a case where the dual-lens circular fish-eye lens unit is mounted to the imaging apparatus, and perform control to notify the inclination of the dual-lens circular fish-eye lens unit with respect to the image sensor based on the acquired inclination information.

15 Claims, 17 Drawing Sheets

(51) Int. Cl.
*H04N 13/239* (2018.01)
*H04N 23/63* (2023.01)

(58) Field of Classification Search
USPC .................................. 348/333.02, 333.04
See application file for complete search history.

(56) References Cited

U.S. PATENT DOCUMENTS

| | | | |
|---|---|---|---|
| 2005/0117024 A1* | 6/2005 | Lee | H04N 5/2628 |
| | | | 348/333.03 |
| 2005/0206736 A1* | 9/2005 | Ng | H04N 23/687 |
| | | | 348/208.99 |
| 2010/0045773 A1* | 2/2010 | Ritchey | H04N 23/698 |
| | | | 348/E7.001 |
| 2011/0109756 A1* | 5/2011 | Yamazaki | H04N 23/64 |
| | | | 348/E5.022 |
| 2011/0242394 A1* | 10/2011 | Ohdate | H04N 23/635 |
| | | | 348/333.02 |
| 2012/0069148 A1 | 3/2012 | Ueda | |
| 2014/0176542 A1* | 6/2014 | Shohara | G06T 17/00 |
| | | | 345/420 |
| 2019/0068890 A1* | 2/2019 | Kazama | H04N 25/46 |
| 2023/0281768 A1 | 9/2023 | Mizuno | |

* cited by examiner

FIG. 5A

| LENS DESIGN VALUE |
| --- |
| LENS INDIVIDUAL VALUE |
| LENS FLAG |
| LENS FOCAL LENGTH |
| LENS TEMPERATURE |
| LENS MOUNT MAXIMUM RATTLE |
| INTRA-LENS ACCELEROMETER INFORMATION |

FIG. 5B

| | |
| --- | --- |
| LENS DESIGN VALUE | IMAGE CIRCLE POSITION |
| | IMAGE CIRCLE DIAMETER |
| | ANGLE OF VIEW |
| | DISTORTION CORRECTION COEFFICIENT |
| LENS INDIVIDUAL VALUE | IMAGE CIRCLE DISPLACEMENT |
| | OPTICAL AXIS INCLINATION |
| | IMAGE MAGNIFICATION DEVIATION |

FIG. 5C

| CAMERA RECORDING AREA INFORMATION |
| --- |
| INTRA-CAMERA ACCELEROMETER INFORMATION |
| RIGHT EXPOSURE CORRECTION INFORMATION |

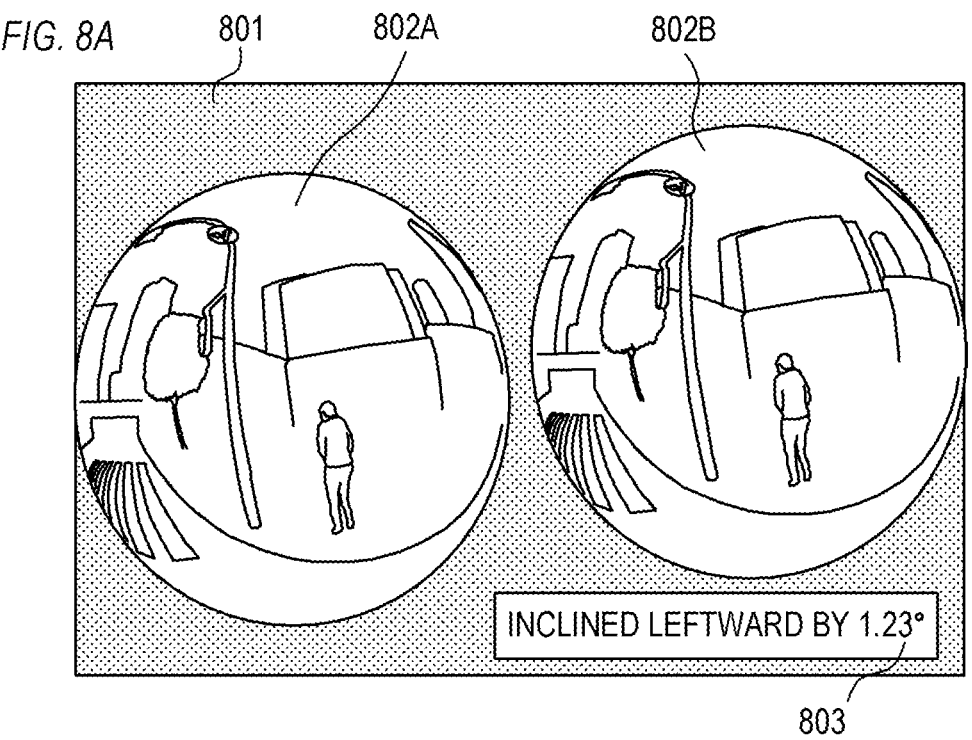
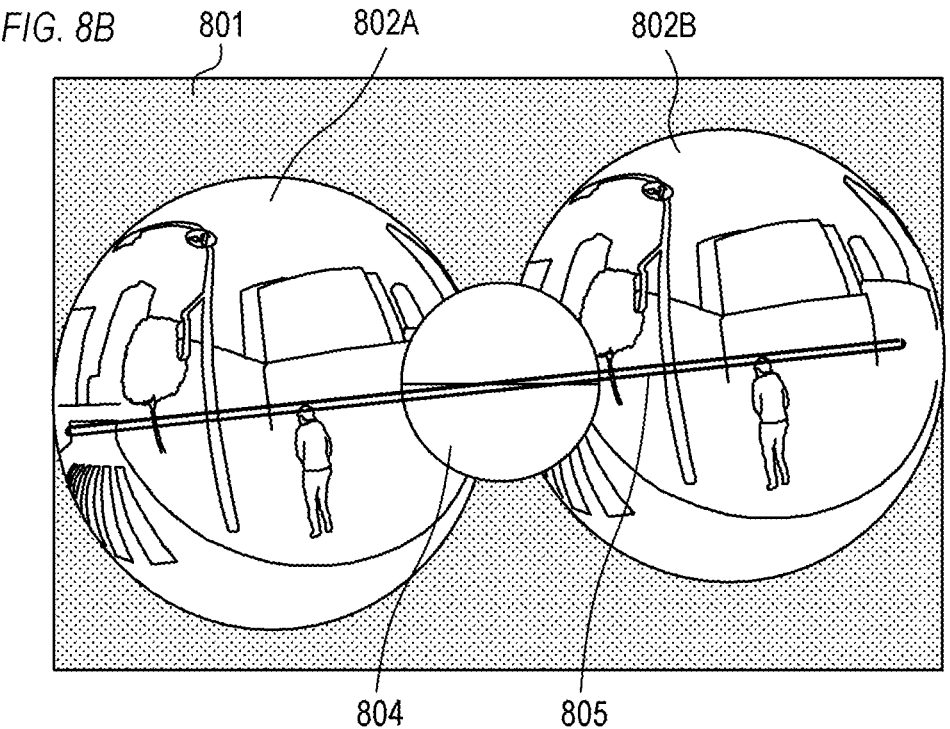

IMAGING APPARATUS, CONTROL METHOD OF IMAGING APPARATUS, AND NON-TRANSITORY COMPUTER READABLE MEDIUM

BACKGROUND OF THE INVENTION

Field of the Invention

The present invention relates to an imaging apparatus, a control method of the imaging apparatus, a non-transitory computer readable medium.

Description of the Related Art

A digital camera having two optical systems is known. If the two optical systems are arranged so as to capture images in the same direction, two images with parallax can be obtained by using the two optical systems, and thus from the obtained two images, an image in a range of 180 degrees (image of a half celestial sphere) can be created, or an image capable of stereoscopic vision can be created. If the two optical systems are arranged so as to capture images in diametrically opposite directions, an image in a range of 360 degrees (omnidirectional image) can be created from the two images acquired by using the two optical systems.

In a digital camera having two optical systems, positional displacement of two images acquired by using the two optical systems may occur. Japanese Patent Application Publication No. 2012-85252 discloses a technique for determining whether appropriate stereoscopic vision is hindered by positional displacement.

However, in the technique disclosed in Japanese Patent Application Publication No. 2012-85252, only positional displacement caused by an individual difference between two optical systems (positional displacement that cannot be reduced by adjustment by the user) is considered. Therefore, the user cannot easily grasp whether the positional displacement can be reduced by the adjustment.

SUMMARY OF THE INVENTION

The present invention provides a technology for enabling a user to easily grasp whether image quality degradation due to positional displacement between two images acquired by using two optical systems can be reduced by adjustment and further enabling the user to suitably perform adjustment.

An imaging apparatus according to the present invention includes an image sensor, a processor, and a memory storing a program which, when executed by the processor, causes the imaging apparatus to acquire inclination information that is information of inclination of a dual-lens circular fish-eye lens unit with respect to the image sensor by analyzing a third image including a first circular fish-eye image area and a second circular fish-eye image area formed on the image sensor via two circular fish-eye lenses in the dual-lens circular fish-eye lens unit in a case where the dual-lens circular fish-eye lens unit is mounted to the imaging apparatus, and perform control to notify the inclination of the dual-lens circular fish-eye lens unit with respect to the image sensor based on the acquired inclination information.

Further features of the present invention will become apparent from the following description of exemplary embodiments with reference to the attached drawings.

BRIEF DESCRIPTION OF THE DRAWINGS

FIG. 5A is a schematic diagram illustrating lens information according to Embodiment 1;

FIG. 5B is a schematic diagram illustrating lens design values and lens individual values according to Embodiment 1;

FIG. 5C is a schematic diagram illustrating camera information according to Embodiment 1;

FIGS. 8A and 8B are schematic diagrams illustrating a method of notifying the inclination according to Embodiment 1;

DESCRIPTION OF THE EMBODIMENTS

An embodiment of the present invention is described in detail with reference to the accompanying drawings.

Embodiment 1

In Embodiment 1, an example in which, in a case where a dual-lens unit (dual lens) is mounted on a digital camera (imaging apparatus), the digital camera detects inclination of the dual-lens unit with respect to an imaging unit (image sensor) and notifies the user of the inclination is described.

Figure 1:
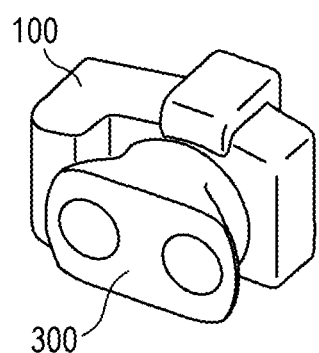
FIG. 1 is a schematic diagram illustrating an entire configuration of a system according to Embodiment 1.

FIG. 1 is a schematic diagram illustrating an example of an entire configuration of a system according to Embodiment 1. The system according to Embodiment 1 includes a digital camera (camera) 100 and a lens unit mounted on the camera 100. In FIG. 1, a lens unit 300 is mounted (connected) to the camera 100. Details of the lens unit 300 are described below, and by mounting the lens unit 300, the camera 100 can capture one image including two image areas (still images or moving images) at a time with a predetermined parallax.

Figure 2A:
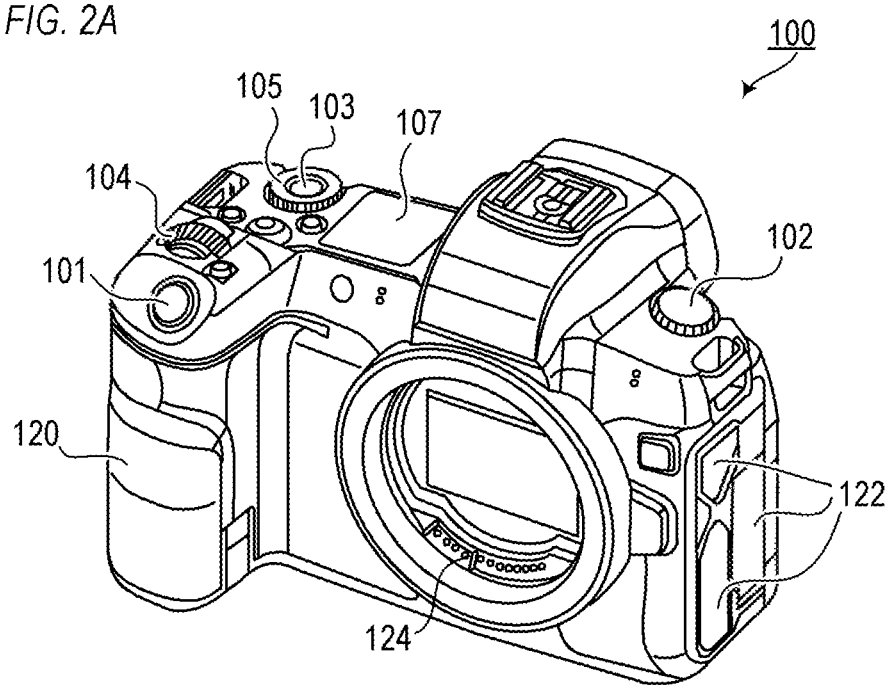
FIGS. 2A and 2B are external views of a camera according to Embodiment 1.
Figure 2B:
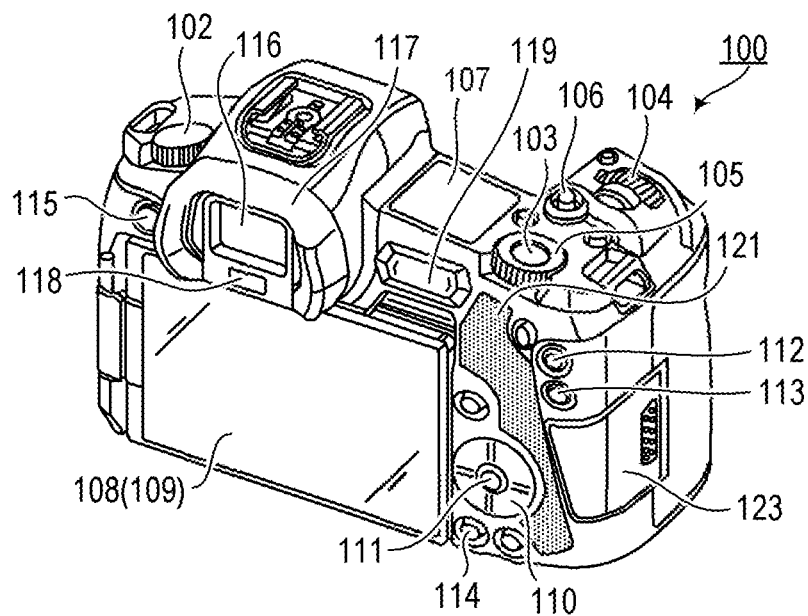

FIGS. 2A and 2B are external views illustrating an example of the appearance of the camera 100. FIG. 2A is a perspective view of the camera 100 viewed from the front side. FIG. 2B is a perspective view of the camera 100 viewed from the back side.

The camera 100 includes, on its upper surface, a shutter button 101, a power switch 102, a mode selector switch 103, a main electronic dial 104, a sub-electronic dial 105, a movie button 106, and an outside viewfinder display unit 107. The shutter button 101 is an operation member for providing a shooting preparation instruction or a shooting instruction. The power switch 102 is an operation member for switching on or off of the power supply of the camera 100. The mode selector switch 103 is an operation member for switching among various modes. The main electronic dial 104 is a rotary operation member for changing setting values such as a shutter speed and an aperture value. The sub-electronic dial 105 is a rotary operation member for moving a selection frame (cursor) and feeding images. The movie button 106 is an operation member for providing an instruction to start or stop moving image shooting (recording). The outside viewfinder display unit 107 displays various setting values such as a shutter speed and an aperture value.

The camera 100 includes, on the back surface, a display unit 108, a touch panel 109, a direction key 110, a SET button 111, an AE lock button 112, an enlargement button 113, a playback button 114, a menu button 115, an eyepiece portion 116, an eyepiece detection unit 118, and a touch bar 119. The display unit 108 displays images and various types of information. The touch panel 109 is an operation member for detecting a touch operation on the display surface (touch operation surface) of the display unit 108. The direction key 110 is an operation unit configured with keys that can be pressed up, down, left and right (four direction keys). Processing corresponding to the position where the direction key 110 is pressed can be performed. The SET button 111 is an operation member to be pressed mainly when a selected item is determined. The AE lock button 112 is an operation member to be pressed when an exposure state is fixed in a shooting standby state. The enlargement button 113 is an operation member for switching on or off an enlargement mode in live view display (LV display) of a shooting mode. In the case where the enlargement mode is switched on, a live view image (LV image) is enlarged or reduced by operating the main electronic dial 104. In addition, the enlargement button 113 is used for enlarging a playback image or increasing an enlargement ratio in a playback mode. The playback button 114 is an operation member for switching between the shooting mode and the playback mode. In case of the shooting mode, by pressing the playback button 114, the mode shifts to the playback mode, so that it is possible to display the latest one of images recorded in a recording medium 227 described below on the display unit 108.

The menu button 115 is an operation member to be pressed for displaying a menu screen, which enables various settings, on the display unit 108. A user can intuitively perform the various settings by using the menu screen displayed on the display unit 108, the direction key 110, and the SET button 111. The eyepiece portion 116 is a portion in which the user approaches and looks through an eyepiece viewfinder (looking-through type viewfinder) 117 with the eyes. The user can visually confirm video displayed on an EVF 217 (electronic view finder) described below in the camera 100 through the eyepiece portion 116. The eyepiece detection unit 118 is a sensor for detecting whether the user approaches the eyepiece portion 116 (eyepiece viewfinder 117) with the eyes.

The touch bar 119 is a linear touch operation member (line touch sensor) capable of receiving a touch operation. The touch bar 119 is disposed at a position that allows a touch operation (allows a touch) with the thumb finger of the right hand in a state in which a grip portion 120 is gripped with the right hand (a state in which the grip portion 120 is gripped with the little finger, the ring finger, and the middle finger of the right hand) such that the shutter button 101 can be pressed by the index finger of the right hand. That is, the touch bar 119 can be operated in a state in which the user approaches to the eyepiece viewfinder 117 with the eyes, looks through the eyepiece portion 116, and holds the camera 100 so as to be able to press the shutter button 101 at any time (shooting orientation). The touch bar 119 can receive a tapping operation on the touch bar 119 (an operation of touching the touch bar and releasing the touch bar without moving the touch position within a predetermined period of time), a sliding operation to the left or right (operation of touching the touch bar and then move the touch position while keeping the touch), and the like. The touch bar 119 is an operation member that is different from the touch panel 109 and does not have a display function. The touch bar 119 functions as, for example, a multi-function bar (M-Fn bar) where various functions can be allocated.

In addition, the camera 100 also has the grip portion 120, a thumb rest portion 121, a terminal cover 122, a lid 123, and a communication terminal 124. The grip portion 120 is a holding portion formed in a shape easy for the user to grip with the right hand when the user holds the camera 100. The shutter button 101 and the main electronic dial 104 are arranged at positions that allow the user to operate the shutter button 101 and the main electronic dial 104 with the index finger of the right hand in a state in which the user holds the camera 100 while gripping the grip portion 120 with the little finger, the ring finger, and the middle finger of the right hand. The sub-electronic dial 105 and the touch bar 119 are arranged at positions that allow the user to operate the sub-electronic dial 105 and the touch bar 119 with the thumb finger of the right hand in the same state. The thumb rest portion 121 (thumb standby position) is a grip portion provided at a place where it is easy for the user to place the thumb finger of the right hand that grips the grip portion 120 on the back side of the camera 100 in a state in which any of the operation members is not operated. The thumb rest portion 121 is configured with a rubber member for enhancing the holding power (gripping feeling). The terminal cover 122 protects connectors such as connection cables for connecting the camera 100 to external devices (external equipment). The lid 123 closes a slot for storing the recording medium 227 described below, to protect the recording medium 227 and the slot. The communication terminal 124 is a terminal for communicating with a lens unit (for example, a lens unit 200 or the lens unit 300 described below) attachable to and detachable from the camera 100.

Figure 3:
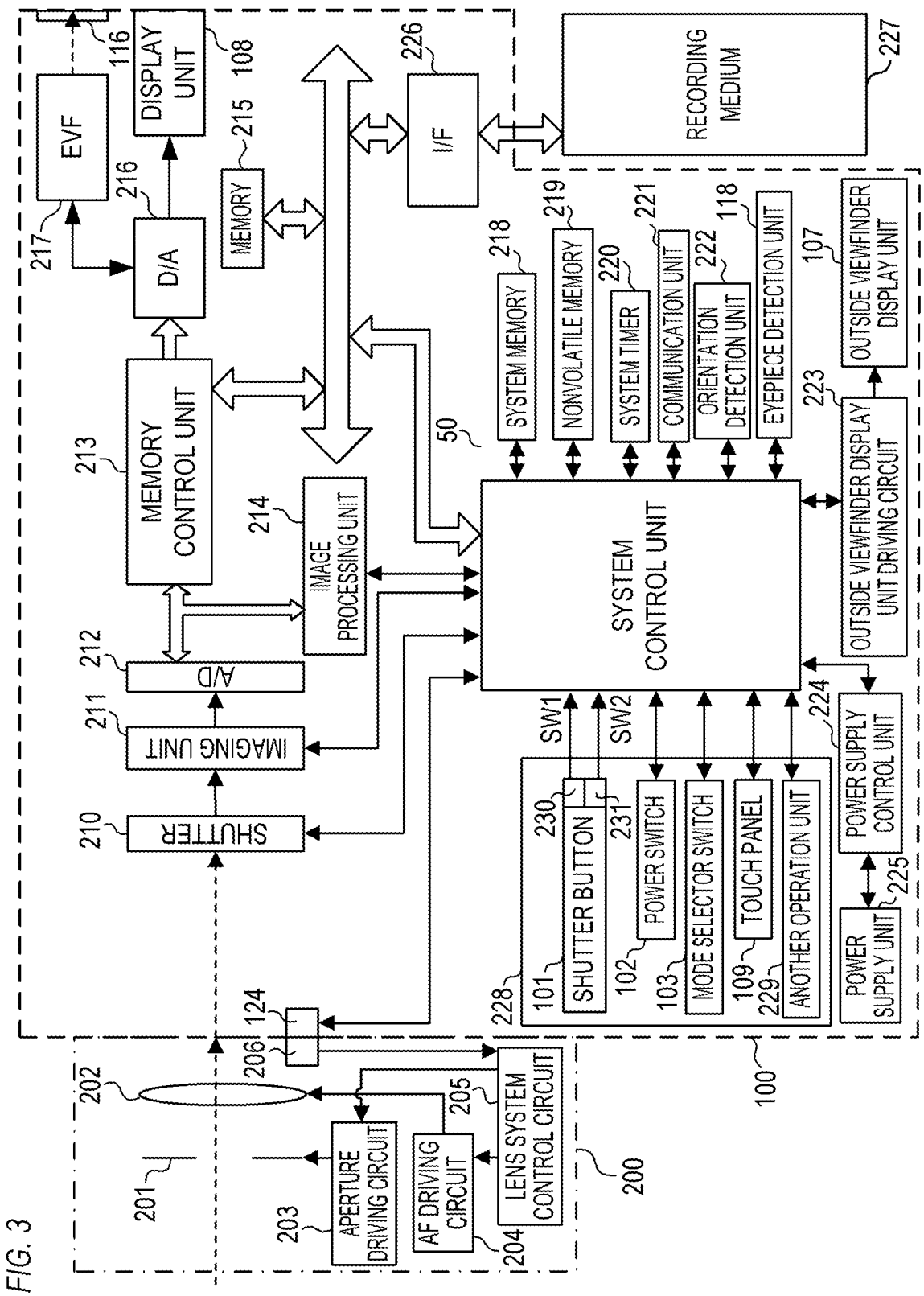
FIG. 3 is a block diagram illustrating a configuration of the camera according to Embodiment 1.

FIG. 3 is a block diagram illustrating an example of the configuration of the camera 100. In FIG. 3, the same components as those in FIGS. 2A and 2B are denoted by the same reference numerals as in FIGS. 2A and 2B, and description thereof is appropriately omitted. In FIG. 3, the lens unit 200 is mounted to the camera 100.

First, the lens unit 200 is described. The lens unit 200 is a type of an interchangeable-lens unit that is attachable to and detachable from the camera 100. The lens unit 200 is a single-lens unit and is an example of a typical lens unit. The lens unit 200 has an aperture 201, a lens 202, an aperture driving circuit 203, an auto focus (AF) driving circuit 204, a lens system control circuit 205, and a communication terminal 206.

The aperture 201 is configured with an adjustable aperture diameter. The lens 202 is configured with a plurality of lenses. The aperture driving circuit 203 adjusts a quantity of light by controlling the aperture diameter of the aperture 201. The AF driving circuit 204 adjusts the focus by driving the lens 202. The lens system control circuit 205 controls the aperture driving circuit 203, the AF driving circuit 204, and the like based on instructions from a system control unit 50 described below. The lens system control circuit 205 controls the aperture 201 via the aperture driving circuit 203 and adjusts the focus by changing the position of the lens 202 via the AF driving circuit 204. The lens system control circuit 205 can communicate with the camera 100. Specifically, the communication is performed via the communication terminal 206 of the lens unit 200 and the communication terminal 124 of the camera 100. The communication terminal 206 is a terminal that allows the lens unit 200 to communicate with the camera 100 side.

The camera 100 is described below. The camera 100 includes a shutter 210, an imaging unit 211, an A/D converter 212, a memory control unit 213, an image processing unit 214, a memory 215, a D/A converter 216, the EVF 217, the display unit 108, and the system control unit 50.

The shutter 210 is a focal-plane shutter capable of freely controlling the exposure time of the imaging unit 211 based on an instruction of the system control unit 50. The imaging unit 211 is an imaging element (image sensor) configured with a CCD, a CMOS element, or the like that convert an optical image into an electrical signal. The imaging unit 211 may include an imaging-area phase-difference sensor for outputting defocus-amount information to the system control unit 50. The A/D converter 212 converts an analog signal output from the imaging unit 211 into a digital signal. The image processing unit 214 performs predetermined processing (such as pixel interpolation, resizing processing such as reduction, and color conversion processing) on data from the A/D converter 212 or data from the memory control unit 213. Moreover, the image processing unit 214 performs predetermined arithmetic processing by using captured image data, and the system control unit 50 performs exposure control and distance measurement control based on the obtained result of arithmetic processing. Through-the-lens (TTL)-type AF processing, auto exposure (AE) processing, and EF (flash pre-flash) processing are performed by this processing. Furthermore, the image processing unit 214 performs predetermined arithmetic processing by using the captured image data, and the system control unit 50 performs TTL-type auto white balance (AWB) processing based on the obtained result of arithmetic processing.

Image data from the A/D converter 212 is written into the memory 215 via the image processing unit 214 and the memory control unit 213. Alternatively, the image data from the A/D converter 212 is written into the memory 215 via the memory control unit 213 without the intervention of the image processing unit 214. The memory 215 stores image data that is obtained by the imaging unit 211 and is converted into digital data by the A/D converter 212 and image data to be displayed on the display unit 108 or the EVF 217. The memory 215 includes a storage capacity sufficient to store a predetermined number of still images and a predetermined length of moving images and voice. The memory 215 also serves as a memory for displaying an image (video memory).

The D/A converter 216 converts image data for display stored in the memory 215 into an analog signal and supplies the analog signal to the display unit 108 or the EVF 217. Accordingly, the image data for display written into the memory 215 is displayed on the display unit 108 or the EVF 217 via the D/A converter 216. The display unit 108 and the EVF 217 provide display in response to the analog signal from the D/A converter 216. The display unit 108 and the EVF 217 are, for example, LCD or organic EL displays. The digital signal that is A/D-converted by the A/D converter 212 and is accumulated in the memory 215 is converted into the analog signal in the D/A converter 216, and the analog signal is sequentially transferred to and displayed on the display unit 108 or the EVF 217, so that live view display is performed.

The system control unit 50 is a control unit including at least one processor and/or at least one circuit. That is, the system control unit 50 may be a processor, may be a circuit, or may be a combination of a processor and a circuit. The system control unit 50 controls the entire camera 100. The system control unit 50 implements the processing of flowcharts described below, by running programs recorded in a nonvolatile memory 219. In addition, the system control unit 50 also performs display control by controlling the memory 215, the D/A converter 216, the display unit 108, the EVF 217, and the like.

The camera 100 also includes a system memory 218, the nonvolatile memory 219, a system timer 220, a communication unit 221, an orientation detection unit 222, and the eyepiece detection unit 118.

For example, a RAM is used as the system memory 218. In the system memory 218, constants, variables, and programs read from the nonvolatile memory 219 for the operation of the system control unit 50 are loaded. The nonvolatile memory 219 is an electrically erasable and recordable memory. For example, an EEPROM is used as the nonvolatile memory 219. In the nonvolatile memory 219, constants, programs, and the like for the operation of the system control unit 50 are recorded. The program as used herein includes programs for executing the flowcharts described below. The system timer 220 is a clocking unit that counts time used for various kinds of control and time of a built-in clock. The communication unit 221 transmits and receives a video signal and a voice signal to and from external equipment connected wirelessly or via a cable. The communication unit 221 is also connectable to a wireless local area network (LAN) and the Internet. Moreover, the communication unit 221 can communicate with external equipment also via Bluetooth (registered trademark) and Bluetooth Low Energy. The communication unit 221 can transmit an image captured by the imaging unit 211 (including a live image) and an image recorded in the recording medium 227 and can receive an image and other various types of information from external equipment. The orientation detection unit 222 detects the orientation of the camera 100 with respect to the direction of gravity. Based on the orientation detected by the orientation detection unit 222, whether an image shot by the imaging unit 211 is an image shot with the camera 100 held in a horizontal position or held in a vertical position can be determined. The system control unit 50 can add orientation information in accordance with the orientation detected by the orientation detection unit 222 to an image file of the image shot by the imaging unit 211 and can rotate the image according to the detected orientation. For example, an acceleration sensor or a gyro sensor can be used for the orientation detection unit 222. The orientation detection unit 222 can also be used to detect the movement of the camera 100 (whether it is panning, tilting, lifting, stationary, or the like).

The eyepiece detection unit 118 can detect an object approaching the eyepiece portion 116 (eyepiece viewfinder 117). For example, an infrared proximity sensor can be used as the eyepiece detection unit 118. When an object approaches, infrared light emitted from a light-emitting portion of the eyepiece detection unit 118 is reflected on the object and is received by a light-receiving portion of the infrared proximity sensor. A distance from the eyepiece portion 116 to the object can be determined according to the amount of received infrared light. In this way, the eyepiece detection unit 118 performs eye approach detection that detects a distance between the eyepiece portion 116 and the object approaching the eyepiece portion 116. The eyepiece detection unit 118 is an eye approach detection sensor that detects approach (eye approach) and separation (eye separation) of an eye (object) to and from the eyepiece portion 116. In a case where an object approaching the eyepiece portion 116 within a predetermined distance is detected in a non-eye approach state (non-approach state), the eyepiece detection unit 118 detects that an eye approaches. On the other hand, in a case where the object of which the approach is detected is separated by a predetermined distance or longer in an eye approach state (approach state), the eyepiece detection unit 118 detects that an eye is separated. A threshold value for detecting the eye approach and a threshold value for detecting the eye separation may be different for providing, for example, a hysteresis. In addition, after the eye approach is detected, the eye approach state is assumed until the eye separation is detected. After the eye separation is detected, the non-eye approach state is assumed until the eye approach is detected. The system control unit 50 switches between display (display state) and non-display (non-display state) of each of the display unit 108 and the EVF 217 according to the state detected by the eyepiece detection unit 118. Specifically, in a case where at least the shooting standby state is established, and a switching setting for a display destination is set to automatic switching, the display destination is set as the display unit 108, and the display is turned on, while the EVF 217 is set to non-display during the non-eye approach state. Also, during the eye approach state, the EVF 217 is set as the display destination, and the display is turned on, while the display unit 108 is set to non-display. Note that the eyepiece detection unit 118 is not limited to the infrared proximity sensor, and other sensors may be used as the eyepiece detection unit 118 as long as the sensors can detect the state which can be regarded as the eye approach.

The camera 100 also has the outside viewfinder display unit 107, an outside viewfinder display unit driving circuit 223, a power supply control unit 224, a power supply unit 225, a recording medium I/F 226, and an operation unit 228.

The outside viewfinder display unit 107 is driven by the outside viewfinder display unit driving circuit 223 and displays various setting values for the camera 100 such as a shutter speed and an aperture value. The power supply control unit 224 is configured with a battery detection circuit, a DC-DC converter, a switch circuit that switches the block to be energized, and the like and detects whether a battery is mounted, the type of battery, the remaining battery level, and the like. Moreover, the power supply control unit 224 controls the DC-DC converter based on the detection result and an instruction from the system control unit 50 and supplies a required voltage to portions including the recording medium 227 for a necessary period. The power supply unit 225 is a primary battery such as alkaline and lithium batteries, a secondary battery such as NiCd, NiMH, and Li batteries, or an AC adapter. The recording medium I/F 226 is an interface to the recording medium 227 such as a memory card and a hard disk. The recording medium 227 is a memory card for recording shot images, and the like and is configured with a semiconductor memory, a magnetic disk, and the like. The recording medium 227 may be attachable to and detachable from the camera 100 or may also be embedded in the camera 100.

The operation unit 228 is an input unit that receives an operation from the user (user operation) and is used for inputting various instructions to the system control unit 50. The operation unit 228 includes the shutter button 101, the power switch 102, the mode selector switch 103, the touch panel 109, and another operation unit 229. The another operation unit 229 include the main electronic dial 104, the sub-electronic dial 105, the movie button 106, the direction key 110, the SET button 111, the AE lock button 112, the enlargement button 113, the playback button 114, the menu button 115, and the touch bar 119.

The shutter button 101 includes a first shutter switch 230 and a second shutter switch 231. The first shutter switch 230 is turned on halfway through the operation of the shutter button 101 in response to so-called half-press (shooting preparation instruction) and outputs a first shutter switch signal SW1. The system control unit 50 starts shooting preparation processing such as AF processing, AE processing, AWB processing, and EF processing in response to the first shutter switch signal SW1. The second shutter switch 231 is turned on at the completion of the operation of the shutter button 101 in response to so-called full-press (shooting instruction) and outputs a second shutter switch signal SW2. In response to the second shutter switch signal SW2, the system control unit 50 starts a sequence of shooting processing involving reading of a signal from the imaging unit 211, generating an image file including the shot image, and writing of the generated image file into the recording medium 227.

The mode selector switch 103 switches the operation mode of the system control unit 50 to any one of a still image shooting mode, a moving image shooting mode, and a playback mode. The still image shooting mode includes modes such as an auto shooting mode, an auto scene-determination mode, a manual mode, an aperture-priority mode (Av mode), a shutter-speed priority mode (Tv mode), and a program AE mode (P mode). The mode also includes various scene modes which have shooting settings for different shooting scenes, a custom mode, and the like. The user can directly switch the mode to any of the above-described shooting modes with the mode selector switch 103. Alternatively, the user can temporarily switch a screen to a list screen of the shooting modes with the mode selector switch 103 and then selectively switch the mode to any of the plurality of displayed modes with the operation unit 228. Likewise, the moving image shooting mode may include a plurality of modes.

The touch panel 109 is a touch sensor for detecting various touch operations on the display surface of the display unit 108 (the operation surface of the touch panel 109). The touch panel 109 and the display unit 108 can be integrally configure a single unit. For example, the touch panel 109 is attached to an upper layer of the display surface of the display unit 108 such that the transmittance of light does not hinder the display on the display unit 108. Furthermore, input coordinates on the touch panel 109 and display coordinates on the display surface of the display unit 108 are associated with each other, thereby configuring a graphical user interface (GUI) with which the user can directly operate a screen displayed on the display unit 108. The touch panel 109 can use any of various methods including resistive, capacitive, surface acoustic wave, infrared, electromagnetic induction, image recognition, and optical sensor methods. Depending on the methods, there are a method of detecting a touch based on contact with the touch panel 109, and a method of detecting a touch based on approach of a finger or a pen to the touch panel 109, but any method may be adopted.

For the touch panel 109, the system control unit 50 can detect the following operations or states:

An operation in which a finger or a pen that is not in contact with the touch panel 109 newly touches the touch panel 109, that is, a start of a touch (hereinafter referred to as touch-down).

A state in which the finger or the pen is in contact with the touch panel 109 (hereinafter referred to as touch-on).

An operation in which the finger or the pen is moving while being in contact with the touch panel 109 (hereinafter referred to as touch-move).

An operation in which the finger or the pen that is in contact with the touch panel 109 is separated from (released from) the touch panel 109, that is, an end of the touch (hereinafter referred to as touch-up).

A state in which nothing is in contact with the touch panel 109 (hereinafter referred to as touch-off).

When the touch-down is detected, the touch-on is detected at the same time. After the touch-down, the touch-on is continuously detected unless the touch-up is detected. Also, when the touch-move is detected, the touch-on is continuously detected. Even if the touch-on is detected, the touch-move is not detected as long as the touch position is not moved. After the touch-up of all the fingers and the pen having been in contact with the touch panel 109 is detected, the touch-off is established.

These operations and states and the position coordinates of the finger or the pen that is in contact with the touch panel 109 are notified to the system control unit 50 through an internal bus. The system control unit 50 determines what kind of operation (touch operation) has been performed on the touch panel 109, based on the notified information. With regard to the touch-move, a movement direction of the finger or the pen moving on the touch panel 109 can be determined for each vertical component and for each horizontal component on the touch panel 109, based on change of the position coordinates. When the touch-move for a predetermined distance or longer is detected, it is determined that a slide operation is performed. An operation in which a finger is swiftly moved by a certain distance while being in contact with the touch panel 109 and is separated is referred to as a flick. In other words, the flick is an operation in which the finger is swiftly slid on the touch panel 109 so as to flick the touch panel 109. When the touch-move for a predetermined distance or longer at a predetermined speed or higher is detected, and the touch-up is then detected, it is determined that the flick is performed (it can be determined that the flick is performed subsequently to the slide operation). Furthermore, a touch operation in which a plurality of places (for example, two points) is both touched (multi-touched) and the touch positions are brought close to each other is referred to as a pinch-in, and a touch operation in which the touch positions are moved away from each other is referred to as a pinch-out. The pinch-out and the pinch-in are collectively referred to as a pinching operation (or simply referred to as a pinch).

Figure 4:
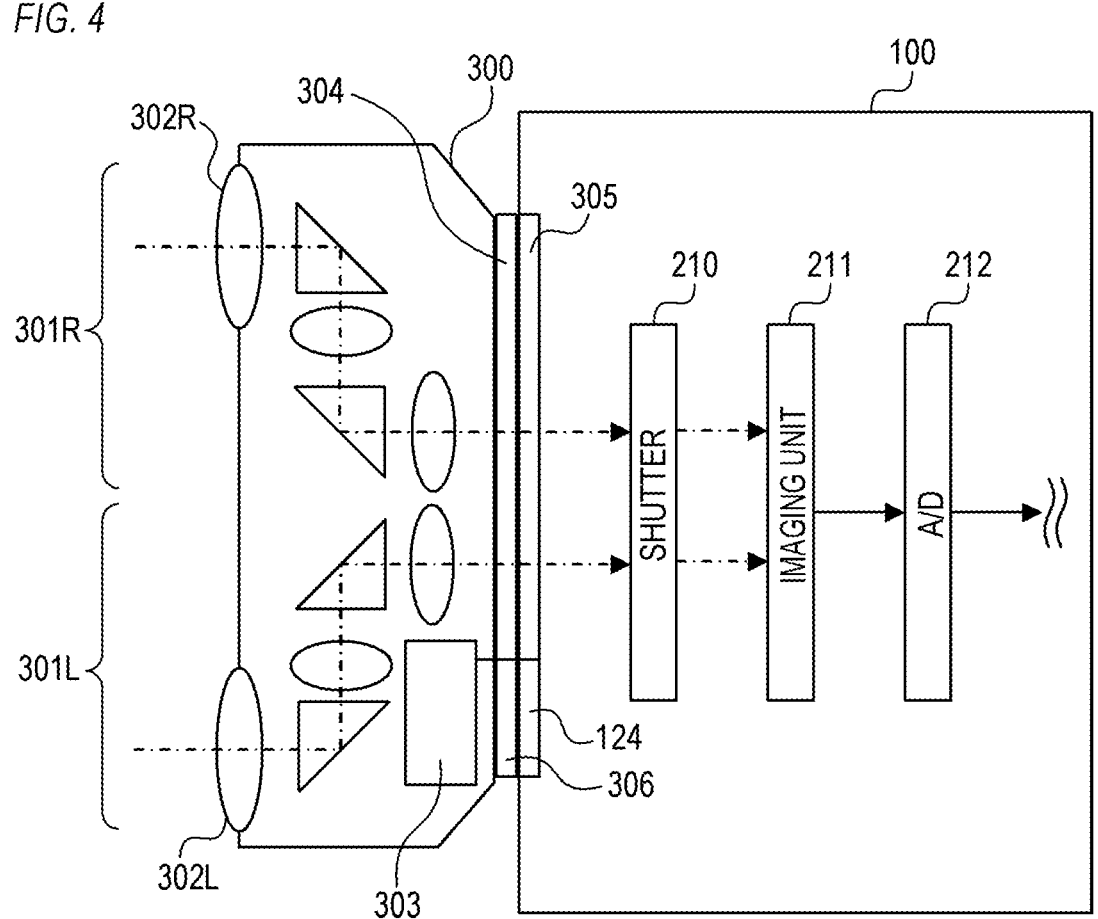
FIG. 4 is a schematic diagram illustrating a configuration of a lens unit according to Embodiment 1.

FIG. 4 is a schematic diagram illustrating an example of the configuration of the lens unit 300. FIG. 4 illustrates a state in which the lens unit 300 is mounted to the camera 100. In FIG. 4, the same components as those described in FIG. 3 are denoted by the same reference numerals as in FIG. 3, and the description thereof is appropriately omitted.

The lens unit 300 is a type of an interchangeable-lens unit attachable to and detachable from the camera 100. The lens unit 300 is a dual-lens unit capable of capturing a right image and a left image having a parallax. The lens unit 300 includes two optical systems, and each of the two optical systems can capture an image in a range at a wide view angle of about 180 degrees. Specifically, each of the two optical systems of the lens unit 300 can capture an image of an object corresponding to a field of view (angle of view) of 180 degrees in the left-to-right direction (horizontal angle, azimuth angle, yaw angle) and 180 degrees in the up-and-down direction (vertical angle, elevation angle, pitch angle). That is, each of the two optical systems can capture an image in a front hemispherical range.

The lens unit 300 has a right-eye optical system 301R including a plurality of lenses and reflecting mirrors, a left-eye optical system 301L including a plurality of lenses and reflecting mirrors, and a lens system control circuit 303. The right-eye optical system 301R includes a lens 302R disposed near the object, and the left-eye optical system 301L includes a lens 302L disposed near the object. The lens 302R and the lens 302L are oriented in the same direction and the optical axes thereof are substantially parallel to each other.

The lens unit 300 is a dual-lens unit (VR180 lens unit) for obtaining a VR180 image which is one of virtual reality (VR) image formats capable of binocular stereoscopic vision. In the lens unit 300, each of the right-eye optical system 301R and the left-eye optical system 301L includes a fish-eye lens capable of capturing a range of about 180 degrees. Note that the range that can be captured by the lens of each of the right-eye optical system 301R and the left-eye optical system 301L may be a range of about 160 degrees narrower than the range of 180 degrees. The lens unit 300 can form the right image formed through the right-eye optical system 301R and the left image formed through the left-eye optical system 301L on one or two imaging elements of the camera to which the lens unit 300 is mounted. In the camera 100, the right image and the left image are formed on one imaging element (image sensor), and one image (binocular image) in which a right image area (area of right image) and a left image area (area of left image) are arranged side by side is generated.

The lens unit 300 is mounted to the camera 100 via a lens mount portion 304 and a camera mount portion 305 of the camera 100. The system control unit 50 of the camera 100 and the lens system control circuit 303 of the lens unit 300 are thus electrically connected to each other via the communication terminal 124 of the camera 100 and the communication terminal 306 of the lens unit 300.

In FIG. 4, the right image formed through the right-eye optical system 301R and the left image formed through the left-eye optical system 301L are formed side by side in the imaging unit 211 of the camera 100. In other words, the right-eye optical system 301R and the left-eye optical system 301L form two optical images (object images) in the two areas of one imaging element (image sensor). The imaging unit 211 converts the formed optical image (optical signal) into an analog electric signal. By using the lens unit 300 in this way, one image including two image areas having a parallax can be acquired from two places (optical systems), that is, the right-eye optical system 301R and the left-eye optical system 301L. By dividing the acquired image into an image for the left eye and an image for the right eye and displaying the VR image, the user can view a stereoscopic VR image about in a 180-degree range. In other words, the user can view a VR180 image stereoscopically.

In this case, the VR image is an image that can be viewed in VR display described below. Examples of the VR image include an omnidirectional image (whole-celestial spherical image) captured by an omnidirectional camera (whole-celestial sphere camera) and a panoramic image having a video range (effective video range) larger than a display range that can be displayed at a time on the display unit. Examples of the VR image also include a moving image and a live image (an image acquired substantially in real time from a camera) as well as a still image. The VR image has a maximum video range (effective video range) corresponding to a field of view of 360 degrees in the left-to-right direction and 360 degrees in the up-and-down direction. Examples of the VR image also include images having an angle of view larger than an angle of view that can be captured by a typical camera or a video range larger than a display range that can be displayed at a time on the display unit, even when the angle of view or video range is smaller than 360 degrees in the left-to-right direction and 360 degrees in the up-and-down direction. An image captured by the camera 100 with the lens unit 300 described above is a type of the VR image. The VR image can be viewed in VR display by setting, for example, the display mode of a display device (a display device capable of displaying a VR image) at "VR view". A certain range of a VR image with a 360-degree angle of view may be displayed, and the user can move the displayed range by changing the orientation of the display device in the left-to-right direction (horizontal rotation direction), so that a seamless omnidirectional video in the left-to-right direction can be viewed.

The VR display (VR view) is a display method (display mode) for displaying, from among VR images, video in a field-of-view range in accordance with the orientation of the display device, the display method being capable of changing a display range. An example of VR display is "single-lens VR display (single-lens VR view)" in which an image is displayed after deformation (distortion correction) for mapping a VR image on a virtual sphere. VR display includes "dual-lens VR display (dual-lens VR view)" in which a left-eye VR image and a right-eye VR image are displayed in left and right areas side by side after deformation for mapping the VR images on a virtual sphere. The "dual-lens VR display" is performed using the left-eye VR image and the right-eye VR image having a parallax, thereby achieving a stereoscopic view of the VR images. In any type of VR display, for example, when the user wears a display device such as a head-mounted display (HMD), video in the field-of-view range corresponding to the direction of the user's face is displayed. For example, it is assumed that from among the VR images, video is displayed in a field-of-view range having the center thereof at 0 degrees (a specific cardinal point, for example, the north) in the left-to-right direction and 90 degrees (90 degrees from the zenith, that is, the horizon) in the up-and-down direction at a certain point in time. In this state, the orientation of the display device is flipped (for example, the display surface is changed from a southern direction to a northern direction), so that from among the same VR images, the display range is changed to video in a field-of-view range having the center thereof at 180 degrees (an opposite cardinal point, for example, the south) in the left-to-right direction and 90 degrees in the up-and-down direction. In other words, when the face of the user wearing the HMD is turned from the north to the south (that is, the user turns around), video displayed on the HMD is changed from a video to the north to a video to the south. The VR image captured by using the lens unit 300 is an image (180-degree image) obtained by capturing the range of about 180 degrees in the front, and there is no video in the range of about 180 degrees in the rear. In the VR display of such an image, when the orientation of the display device is changed to a side where video does not exist, a blank area is displayed.

Such VR display of a VR image makes the user feel like staying in the VR image (VR space) in a visual form (sense of immersion). Note that the VR image display method is not limited to a method for changing the orientation of the display device. For example, the display range may be moved (scrolled) in response to a user operation via a touch panel or directional buttons. In addition to the change of the display range by changing the orientation during VR display (in the "VR View" display mode), the display range may be moved in response to the touch-move on the touch panel, a dragging operation with a mouse device or the like, or pressing the directional buttons. A smartphone mounted to VR goggles (head-mounted adapter) is a type of the HMD.

FIG. 5A is a schematic diagram of exemplary lens information to be acquired from the dual-lens unit. The lens information includes 1. Lens design value,
2. Lens individual value,
3. Lens flag,
4. Lens focal length,
5. Lens temperature,
6. Lens mount maximum rattle, and
7. Intra-lens accelerometer information.

The lens design value is a design value for correcting an aberration. Errors such as lens eccentricity and inclination occur in each of the two optical systems (the left-eye optical system 301L and the right-eye optical system 301R) in the manufacturing of the dual-lens unit. If the left-right exchange (exchange of left image area and the right image area) or the equidistant cylinder transformation is performed without consideration of an error, the quality of dual-lens VR display is reduced, leading to difficulty in obtaining a satisfactory stereoscopic view. The lens individual values are measurement results of errors detected in the manufacturing of the dual-lens unit (manufacturing errors). The lens design value and the lens individual value are specifically described below with reference to FIG. 5B.

The lens flag is a flag indicating that the lens is a dual-lens unit and can be used to determine whether a dual-lens unit is used. The lens focal length is a distance from "principal point", which is the center of the lens, to the imaging element (image-forming position). The lens focal length may be or may not be a common parameter for the two optical systems of the dual-lens unit (the left-eye optical system 301L and the right-eye optical system 301R). In order to provide high-quality dual-lens VR display by accurately performing left-right exchange or performing the equidistant cylinder transformation, a detailed (high-accuracy) lens focal length is required. The lens temperature is the temperature of the dual-lens unit and is used to grasp the ambient temperature or the like at the time of shooting.

The lens mount maximum rattle is a design value of play generated in the mount portion (connection portion) of the dual-lens unit and the camera. The maximum inclination of the dual-lens unit with respect to the image sensor is determined by the play generated in the mount portion of the dual-lens unit and the camera. Note that the lens mount maximum rattle may be included in the camera information described below. The lens mount maximum rattle may be included only in one of the lens information and the camera information or may be included in both the lens information and the camera information. An example of using the lens mount maximum rattle is described in Embodiment 2.

The intra-lens accelerometer information is orientation information obtained by using an acceleration sensor (level) in the dual-lens unit and indicates the orientation of the lens in the rolling direction or the pitch direction. An example of using the intra-lens accelerometer information is described in Embodiment 3.

FIG. 5B is a schematic diagram illustrating the detail of the lens design value and the lens individual value. The lens design value and the lens individual value are used for left-right exchange and equidistant cylinder transformation.

The lens design value includes:
1. Image circle position,
2. Image circle diameter,
3. Angle of view, and
4. Distortion correction coefficient.

The image circle position is coordinates of the optical axis center of the optical system in the image to be captured (an image including a right image area and a left image area) and is prepared for each of the two optical systems of the dual-lens unit (the left-eye optical system 301L and the right-eye optical system 301R). In other words, the image circle position is center coordinates of an image circle (circular fish-eye image) formed on the imaging element and is prepared for each of the right image and the left image. The origin point of coordinates is, for example, the center of the imaging element (the center of an image to be captured). The image circle position includes coordinates in the horizontal direction and coordinates in the vertical direction. A variety of information on the optical axis center of the optical system in an image to be captured may be used as the image circle position. For example, a distance from a predetermined position (the center or an upper-left corner) in the image to be captured to the optical axis center may be used.

The image circle diameter is the diameter of an image circle (circular fish-eye image) formed on the imaging element. The angle of view is an angle of view of an image circle (circular fish-eye image) formed on the imaging element. The distortion correction coefficient is the ratio of a design image height to the ideal image height of the lens. A distortion correction coefficient may be set for each image height. For the image height for which distortion correction coefficient is not set, a distortion correction coefficient may be calculated by interpolation in which a plurality of distortion correction coefficients is used. An approximate polynomial may be set for the relationship between an image height and a distortion correction coefficient. The image circle diameter, the angle of view, and the distortion correction coefficient may be or may not be common parameters for the two optical systems of the dual-lens unit (the left-eye optical system 301L and the right-eye optical system 301R).

The lens individual value includes
5. image circle displacement,
6. optical axis inclination,
7. image magnification deviation, and the like. These kinds of information are prepared by carrying out measurement about each of the two optical systems of the dual-lens unit (the left-eye optical system 301L and the right-eye optical system 301R).

The image circle displacement is a deviation of the center coordinates of an image circle (circular fish-eye image), which is formed on the imaging element, from the design value. For example, the image circle displacement includes a deviation in the horizontal direction and a deviation in the vertical direction. A deviation in the horizontal direction is indicated by coordinates in the horizontal direction, and a deviation in the vertical direction is indicated by coordinates in the vertical direction, with the origin point located at the coordinates of a design value (two-dimensional coordinates including coordinates in the horizontal direction and coordinates in the vertical direction). The optical axis inclination is a deviation from the design value in the direction of the optical axis near an object. For example, the optical axis inclination includes a deviation in the horizontal direction and a deviation in the vertical direction. A deviation in each direction is indicated by an angle. The image magnification deviation is a deviation of the size of an image circle (circular fish-eye image), which is formed on the imaging element, from the design value. The deviation is indicated by, for example, a ratio to the design value.

FIG. 5C is a schematic diagram illustrating an example of the camera information generated in the camera. For example, the camera information is used for providing high-quality VR display. The camera information includes:
1. Camera recording area information,
2. Intra-camera accelerometer information,
3. Right exposure correction information, and the like.

The camera recording area information is information on effective image areas. The effective image area that can be displayed varies depending on the sensor of the camera and the recording mode. The intra-camera accelerometer information is orientation information obtained by using an acceleration sensor (level) in the camera and indicates the orientation of the camera in the rolling direction or the pitch direction. The right exposure correction information is an exposure set value for bringing the exposure of the right image area close to the exposure of the left image area.

Figure 6:
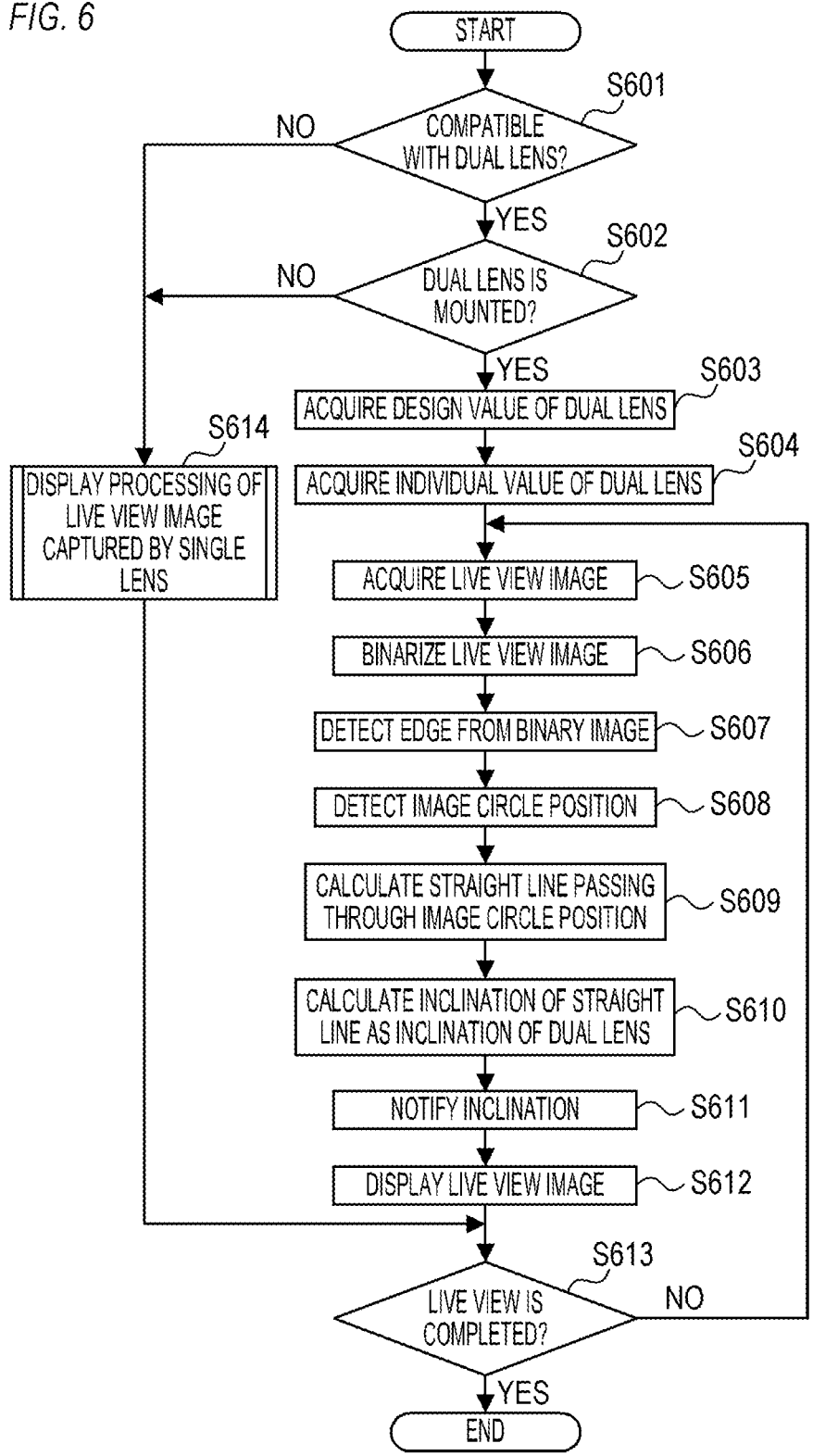
FIG. 6 is a flowchart showing operations of the camera according to Embodiment 1.

FIG. 6 is a flowchart showing an example of operations of the camera 100. These operations are implemented by loading a program recorded in the nonvolatile memory 219 into the system memory 218 and executing the program by the system control unit 50. For example, when the camera 100 is started, the operations of FIG. 6 are started. The operation of FIG. 6 is an operation of displaying a live view image (an image representing an object in substantially real time) captured by the imaging unit 211 on the EVF 217 or the display unit 108. The operations of FIG. 6 are performed when the camera 100 is in a shooting standby state (shooting mode).

In step S601, the system control unit 50 determines whether the camera 100 is compatible with a dual-lens unit (for example, the lens unit 300). For example, the system control unit 50 determines whether the version of the firmware of the system control unit 50 is compatible with the dual-lens unit. If it is determined that the version is compatible with the dual-lens unit, the processing proceeds to step S602, but otherwise the processing proceeds to step S614. According to Embodiment 1, in the case of a dual-lens unit, unlike the case of a normal single-lens unit, it is required to acquire and record information on the dual-lens unit (lens information; information on the two optical systems of the dual-lens unit) for post processing. Therefore, the processing in step S601 is required.

In step S602, the system control unit 50 determines whether the dual-lens unit is mounted to the camera 100. If it is determined that the dual-lens unit is mounted, the processing proceeds to step S603, but otherwise the processing proceeds to step S614. If the dual-lens unit is newly mounted from a state in which the dual-lens unit is not mounted, the processing also proceeds to step S603. If the dual-lens unit is removed from the state in which the dual-lens unit is mounted, and then the single-lens unit is mounted, the processing proceeds to step S614.

In step S603, the system control unit 50 acquires, from the mounted (connected) dual-lens unit, the design values of the dual-lens unit. The design value is a parameter in design and is used for left-right exchange or the equidistant cylinder transformation. For example, an image circle position, an image circle diameter, an angle of view, and a distortion correction coefficient illustrated in FIG. 5B are acquired.

In step S604, the system control unit 50 acquires, from the mounted (connected) dual-lens unit mounted, individual values of the dual-lens unit. The individual value is a parameter specific for a lens unit, for example, an error during manufacturing (manufacturing error). For example, the image circle displacement, the optical axis inclination, and the image magnification deviation illustrated in FIG. 5B are acquired. By using the individual value, image processing can be performed with higher accuracy than that in a case of only using a design value.

Figure 7A:
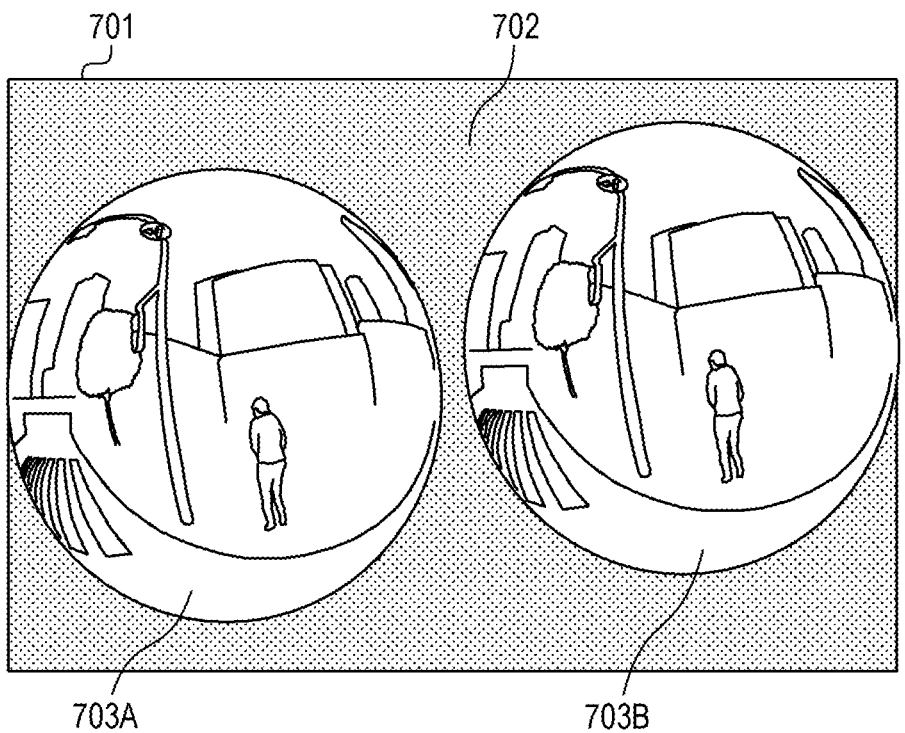
FIGS. 7A and 7B are schematic diagrams illustrating a method of calculating an inclination according to Embodiment 1.

In step S605, the system control unit 50 acquires a live view image including the right image area and the left image area from the imaging unit 211. FIG. 7A is a schematic diagram illustrating an example of the live view image acquired in step S605. The live view image 701 includes an invalid area 702 outside an image circle and effective areas 703A and 703B each of which is the image circle. For example, the effective area 703A is an image circle (right image area) of the right-eye optical system 301R, and the effective area 703B is an image circle (left image area) of the left-eye optical system 301L.

In step S606, the system control unit 50 performs binarization so as to assign different values to the effective area and the invalid area of the live view image acquired in step S605. For example, binarization is performed by using a threshold value determined in advance at the time of manufacturing the dual-lens unit or the camera 100. By performing binarization, the processing of step S607 (detection of the outline (outer periphery) of the image circle) described below is facilitated.

In step S607, the system control unit 50 detects an edge from the binary image obtained in step S606 by using the edge filter. As a result, the outline (outer periphery) of each of the two image circles (the right image area and the left image area) is detected.

Figure 7B:
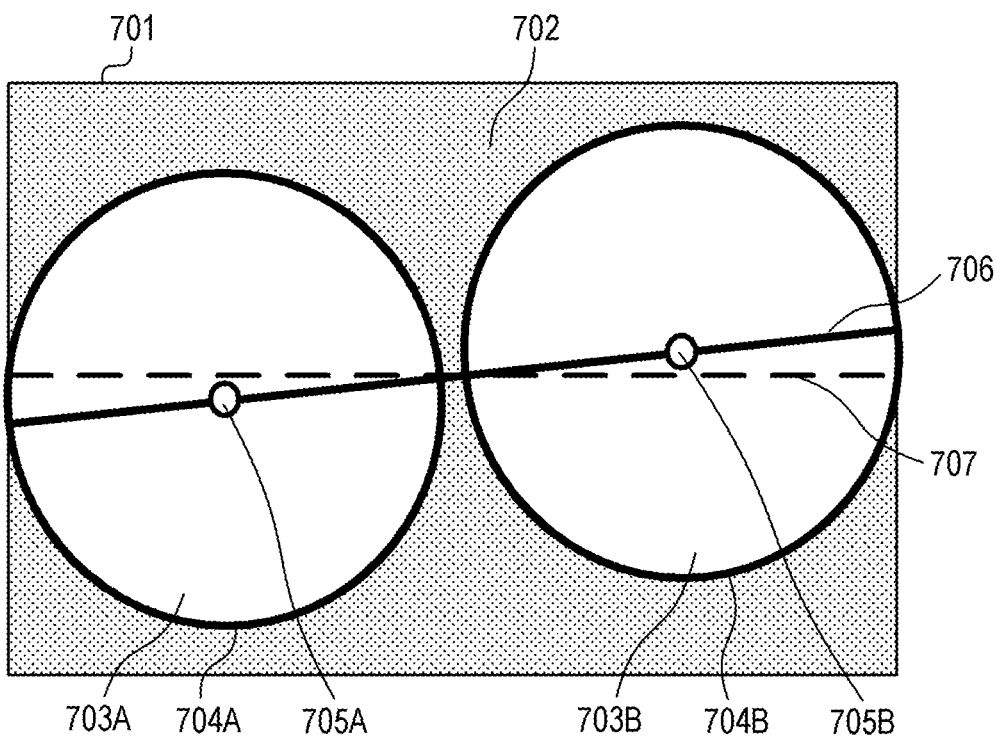

In step S608, the system control unit 50 calculates two perfect circles having the same size approximate to the two image circles detected in step S607 by using the least squares method. Then, the system control unit 50 determines the center position each of the calculated two perfect circles as the image circle positions (positions corresponding to the optical axis centers of the lenses) of the two image circles. For example, perfect circles 704A and 704B in FIG. 7B are calculated, and image circle positions 705A and 705B are detected (specified). According to this method, the image circle position can be detected with higher accuracy than in a case where the perfect circle is not calculated. Note that, in FIG. 7B, the same components as those of FIG. 7A are indicated by the same reference numerals as in FIG. 7A, and the description thereof is appropriately omitted.

In step S609, the system control unit 50 calculates a straight line passing through the two image circle positions detected in step S608. For example, a straight line 706 passing through the image circle positions 705A and 705B in FIG. 7B is calculated.

In step S610, the system control unit 50 calculates the inclination of the straight line calculated in step S609 with respect to a predetermined direction of the live view image as the inclination of the dual-lens unit with respect to the imaging unit 211 (image sensor). This processing can also be interpreted as processing of calculating an angle between the straight line calculated in step S609 and a predetermined direction of the live view image. In step S610, for example, an angle between the straight line 706 and the horizontal direction 707 of the live view image 701 (left-to-right direction; lateral direction) is calculated. Note that the predetermined direction is not particularly limited, and may be, for example, a vertical direction (up-and-down direction; perpendicular direction).

In step S611, the system control unit 50 notifies the user of the inclination calculated in step S610. In Embodiment 1, the system control unit 50 notifies the inclination calculated in step S610 by display on the EVF 217 or the display unit 108. Note that a method of notifying the inclination is not particularly limited, and notification may be performed by, for example, voice output.

In step S612, the system control unit 50 displays the live view image acquired in step S605 on the EVF 217 or the display unit 108.

In step S613, the system control unit 50 determines whether to end the live view display. For example, in a case where the user instructs the camera 100 to end the live view display or change the mode to a mode other than the shooting mode, the system control unit determines to end the live view display. In a case where the system control unit determines to end the live view display, the operation of FIG. 6 is ended, and otherwise, the processing proceeds to step S605.

When a single-lens unit is mounted to the camera 100, the processing in step S614 is performed. In step S614, the system control unit 50 displays the live view image captured by the single-lens unit on the EVF 217 or the display unit 108. The processing of step S614 is identical to processing in the related art of displaying a live view image captured by the single-lens unit, and thus detailed description thereof is omitted. When the processing of step S614 ends, the operation of FIG. 6 ends.

FIGS. 8A and 8B are schematic diagrams illustrating an example of the processing in step S611 (notification of the inclination of the dual-lens unit with respect to the imaging unit 211 (image sensor)). FIG. 8A illustrates an example of displaying a message indicating the inclination (angle) calculated in step S610. In FIG. 8A, a message 803 indicating the inclination (angle) is displayed to be superimposed on the live view image 801 including effective areas 802A and 802B (the right image area and the left image area). FIG. 8B illustrates an example of displaying an indicator indicating the inclination (angle) calculated in step S610. In FIG. 8B, an item 804 indicating a horizontal line and an item 805 inclined at the inclination (angle) calculated in step S610 are displayed to be superimposed on the live view image 801 including the effective areas 802A and 802B (right image area and left image area).

As described above, according to Embodiment 1, in a case where a specific lens unit (specific lens) is mounted on the imaging apparatus, information on the inclination of the specific lens unit with respect to the image sensor is acquired. Then, the inclination of the specific lens unit with respect to the image sensor is notified to the user based on the acquired information. In this way, the user can easily grasp whether the image quality degradation caused by the positional displacement between the two images acquired by using the two optical systems can be reduced by the adjustment. Specifically, the user can easily grasp whether the specific lens unit is inclined with respect to the image sensor. As a result, the user can suitably perform adjustment (lens adjustment) before shooting.

Note that the information on the inclination of the specific lens unit with respect to the image sensor is preferably acquired in consideration of a manufacturing error of the specific lens unit. By considering the manufacturing error, information indicating the inclination more accurately can be obtained.

Embodiment 2

In Embodiment 1, an example is described in which, in a case where the dual-lens unit is mounted to the imaging apparatus, two image circle positions are detected by image processing from the live view image, and the inclination of a straight line passing through the two image circle positions is calculated as the inclination of the dual-lens unit. In Embodiment 2, an example is described in which a lens unit that can project light indicating a predetermined direction (for example, a horizontal direction or a vertical direction) in the lens unit onto an image sensor is mounted as a specific lens unit in an imaging apparatus. Hereinafter, description of the same points as those of Embodiment 1 (for example, the same configuration and processing as those of Embodiment 1) is appropriately omitted.

Figure 9A:
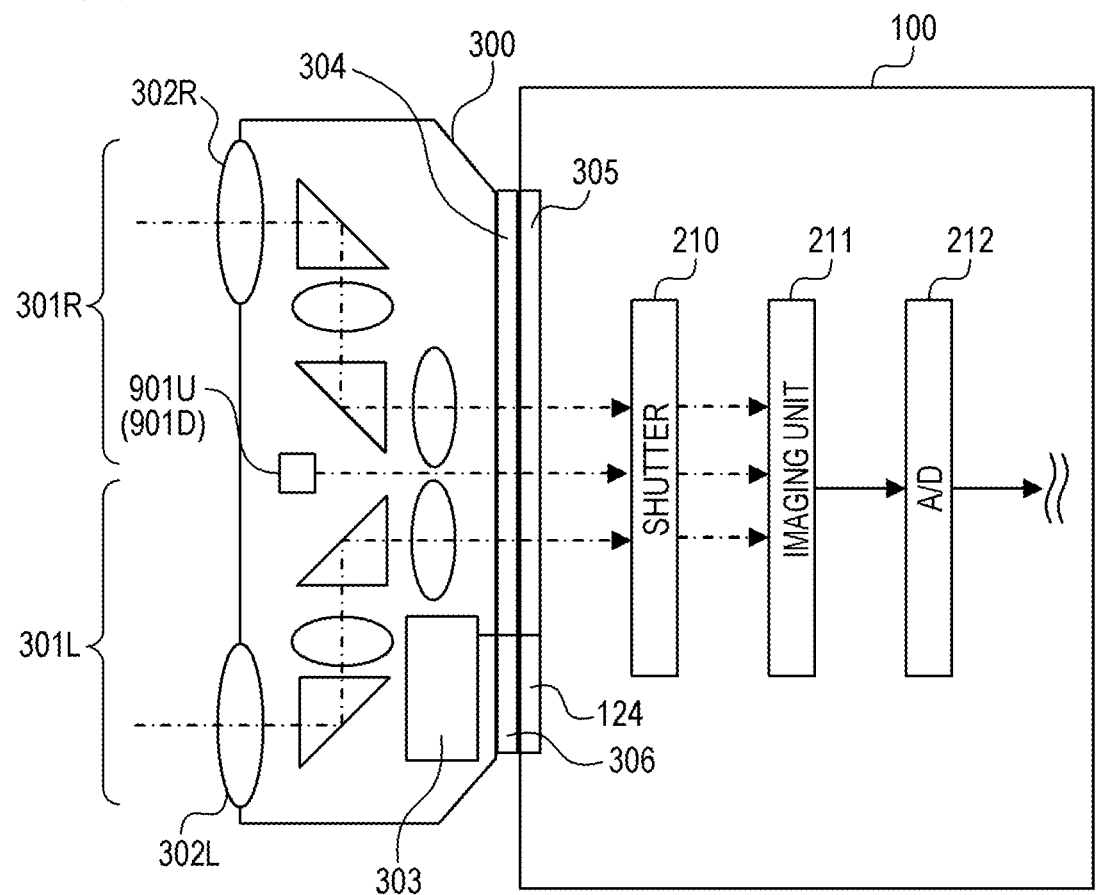
FIGS. 9A and 9B are schematic diagrams illustrating a configuration of a lens unit according to Embodiment 2.
Figure 9B:
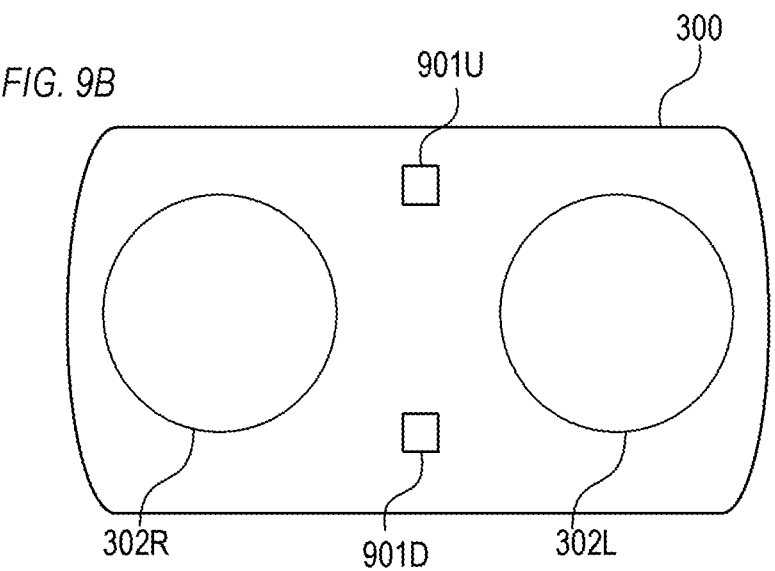

FIGS. 9A and 9B are schematic diagrams illustrating an example of a configuration of the lens unit 300 (dual-lens unit) according to Embodiment 2. FIG. 9A illustrates a state in which the lens unit 300 is mounted to the camera 100 and viewed from above. FIG. 9B illustrates a state in which the lens unit 300 is viewed from the front. Note that the lens unit that can project light indicating a predetermined direction in the lens unit onto the image sensor may not be a dual-lens unit and may be, for example, an anamorphic lens unit (anamorphic lens). In FIGS. 9A and 9B, the same components as those in FIG. 4 are denoted by the same reference numerals as in FIG. 4, and description thereof is appropriately omitted.

Projection units 901U and 901D are used to project light indicating the vertical direction of the lens unit 300 onto an image sensor (imaging unit 211). For example, each of the projection units 901U and 901D may be a laser light source that projects laser light onto the image sensor or may be a hole (opening) that projects external light onto the image sensor. The projection units 901U and 901D are arranged side by side in the vertical direction of the lens unit 300, and two points arranged side by side in the vertical direction of the lens unit 300 are projected on the image sensor by the projection units 901U and 901D. Note that the light indicating the predetermined direction in the lens unit may not be the light of two points arranged side by side in the predetermined direction. For example, a line segment extending in a predetermined direction in the lens unit may be projected on the image sensor.

Figure 10:
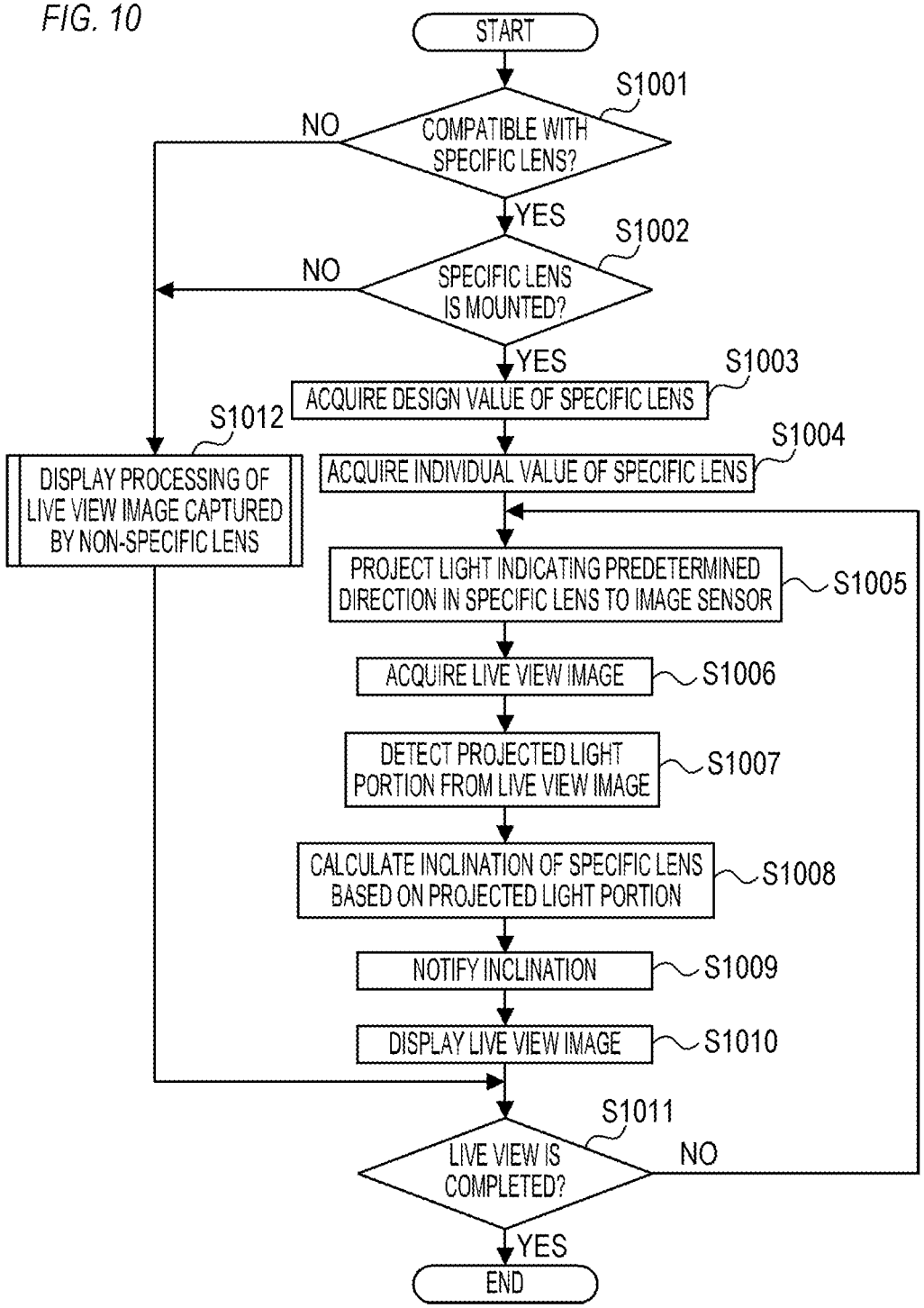
FIG. 10 is a flowchart showing operations of a camera according to Embodiment 2.

FIG. 10 is a flowchart showing an example of operations of the camera 100 according to Embodiment 2. These operations are implemented by loading a program recorded in the nonvolatile memory 219 into the system memory 218 and executing the program by the system control unit 50. For example, when the camera 100 is started, the operations of FIG. 10 are started. The operation of FIG. 10 is an operation of displaying the live view image captured by the imaging unit 211 on the EVF 217 or the display unit 108. The operations of FIG. 10 are performed in a case where the camera 100 is in a shooting standby state.

In step S1001, the system control unit 50 determines whether the camera 100 is compatible with a specific lens unit. Here, the specific lens unit is a lens unit that can project light indicating a predetermined direction in the lens unit onto the image sensor and is, for example, the lens unit 300 in FIGS. 9A and 9B. In a case where it is determined that the camera is compatible with the specific lens unit, the processing proceeds to step S1002, but otherwise the processing proceeds to step S1012. The determination method is similar to step S601 in FIG. 6.

In step S1002, the system control unit 50 determines whether the specific lens unit is mounted to the camera 100. If it is determined that the specific lens unit is mounted, the processing proceeds to step S1003, but otherwise the processing proceeds to step S1012. Note that, if the specific lens unit is newly mounted from a state in which the specific lens unit is not mounted, the processing also proceeds to step S1003. In a case where the specific lens unit is detached from a state in which the specific lens unit is mounted and a lens unit (non-specific lens unit) different from the specific lens unit is mounted, the processing proceeds to step S1012. The determination method is similar to step S602 in FIG. 6.

In step S1003, the system control unit 50 acquires, from the mounted (connected) specific lens unit, design values of the specific lens unit. The acquisition method is similar to step S603 in FIG. 6.

In step S1004, the system control unit 50 acquires, from the mounted (connected) specific lens unit, individual values of the specific lens unit. The acquisition method is similar to step S604 in FIG. 6.

In step S1005, the system control unit 50 controls the mounted (connected) specific lens unit so as to project light indicating a predetermined direction in the specific lens unit (for example, two points arranged side by side in the predetermined direction) onto the imaging unit 211 (image sensor).

Figure 11:
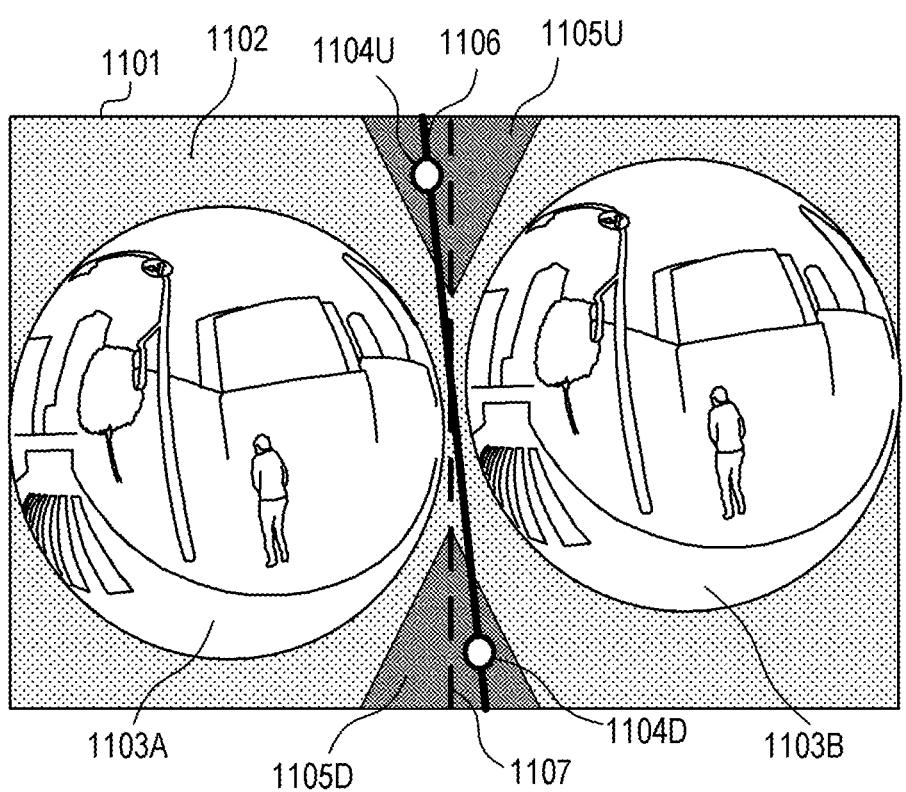
FIG. 11 is a schematic diagram illustrating a method of calculating an inclination according to Embodiment 2.

In step S1006, the system control unit 50 acquires a live view image from the imaging unit 211. The acquisition method is similar to step S605 in FIG. 6. FIG. 11 is a schematic diagram illustrating an example of a live view image acquired in step S1006. A live view image 1101 includes an invalid area 1102 outside an image circle and effective areas 1103A and 1103B each of which is the image circle. Further, the live view image 1101 includes two areas 1104U and 1104D arranged side by side in the vertical direction in the specific lens unit.

In step S1007, the system control unit 50 detects a portion corresponding to the light projected in step S1005 from the live view image acquired in step S1006. For example, the system control unit 50 sets the maximum range in which the area 1104U in FIG. 11 can exist as a search area 1105U and sets the maximum range in which the area 1104D can exist as a search area 1105D based on the lens mount maximum rattle acquired in step S1003. Then, the system control unit 50 detects the area 1104U from the search area 1105U and detects the area 1104D from the search area 1105D.

In step S1008, the system control unit 50 calculates the inclination of the specific lens unit with respect to the imaging unit 211 (image sensor) based on the portion detected in step S1007. For example, the system control unit 50 calculates the center-of-gravity position of each of the areas 1104U and 1104D in FIG. 11 and calculates a straight line 1106 passing through the calculated two center-of-gravity positions. Then, the system control unit 50 calculates an angle between the straight line 1106 and the vertical direction 1107 of the live view image 1101 as an angle of inclination of the specific lens unit with respect to the imaging unit 211.

In step S1009, the system control unit 50 notifies the user of the inclination calculated in step S1008. The notification method is similar to step S611 in FIG. 6.

In step S1010, the system control unit 50 displays the live view image acquired in step S1006 on the EVF 217 or the display unit 108. The display method is similar to step S612 in FIG. 6.

In step S1011, the system control unit 50 determines whether to end the live view display. In a case where the system control unit determines to end the live view display, the operation of FIG. 10 is ended, and otherwise, the processing proceeds to step S1005. The determination method is similar to step S613 in FIG. 6.

When a non-specific lens unit is mounted to the camera 100, the processing in step S1012 is performed. In step S1012, the system control unit 50 displays the live view image captured by the non-specific lens unit on the EVF 217 or the display unit 108. The processing of step S1012 is identical to processing in the related art of displaying a live view image, and thus detailed description thereof is omitted. When the processing of step S1012 ends, the operation of FIG. 10 ends.

According to Embodiment 2, in a case where a lens unit that can project light indicating a predetermined direction in the lens unit onto an image sensor is mounted as a specific lens unit in the imaging apparatus, the same effect as in Embodiment 1 can be obtained.

Embodiment 3

In Embodiment 3, an example in a case where a lens unit that can detect an orientation is mounted as a specific lens unit in an imaging apparatus is described. Hereinafter, description of the same points as those of Embodiment 1 (for example, the same configuration and processing as those of Embodiment 1) is appropriately omitted.

Figure 12:
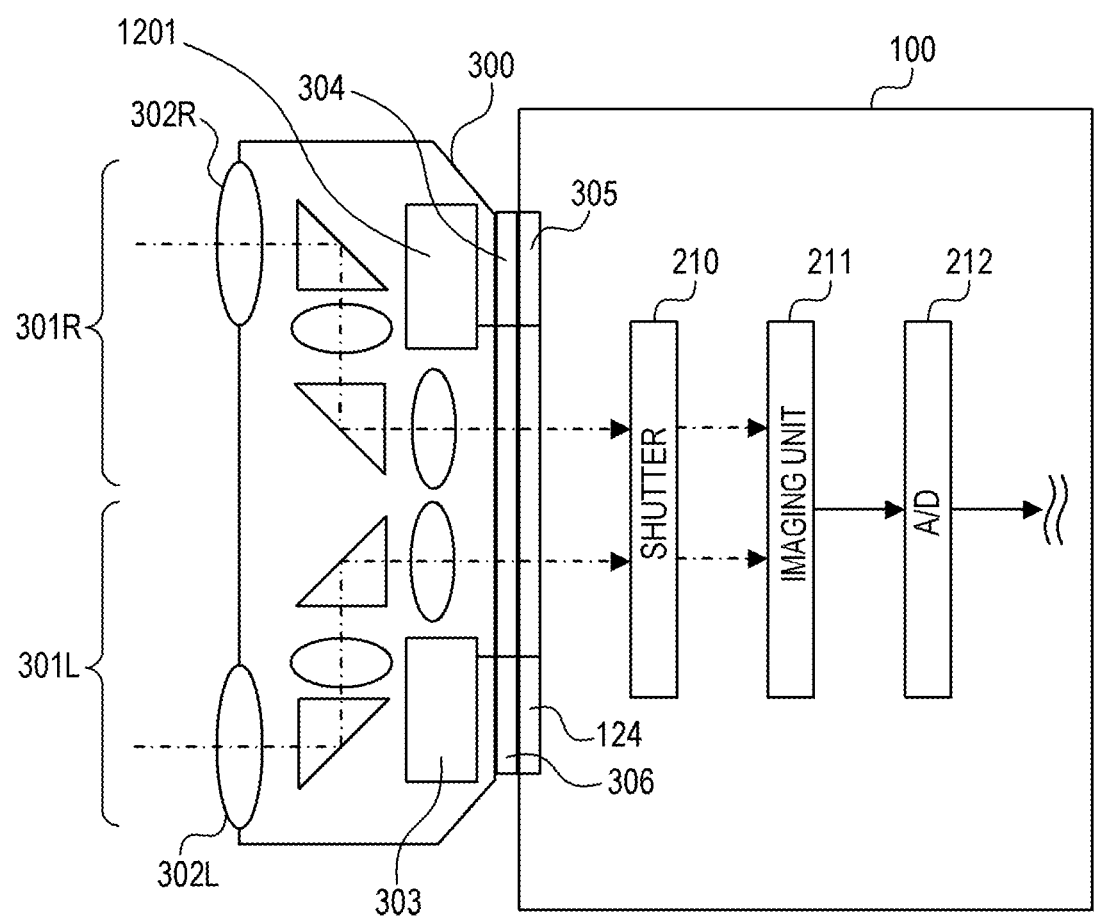
FIG. 12 is a schematic diagram illustrating a configuration of a lens unit according to Embodiment 3.

FIG. 12 is a schematic diagram illustrating an example of a configuration of the lens unit 300 (dual-lens unit) according to Embodiment 3. FIG. 12 illustrates a state in which the lens unit 300 is mounted to the camera 100. Note that the lens unit that can detect the orientation may not be a dual-lens unit and may be, for example, an anamorphic lens unit. In FIG. 12, the same components as those in FIG. 4 are denoted by the same reference numerals as in FIG. 4, and description thereof is appropriately omitted.

An orientation detection unit 1201 detects the orientation of the lens unit 300 with respect to the direction of gravity. For example, an acceleration sensor or a gyro sensor can be used for the orientation detection unit 1201. The orientation detection unit 1201 can also be used to detect the movement of the lens unit 300 (whether it is panning, tilting, lifting, stationary, or the like).

Figure 13:
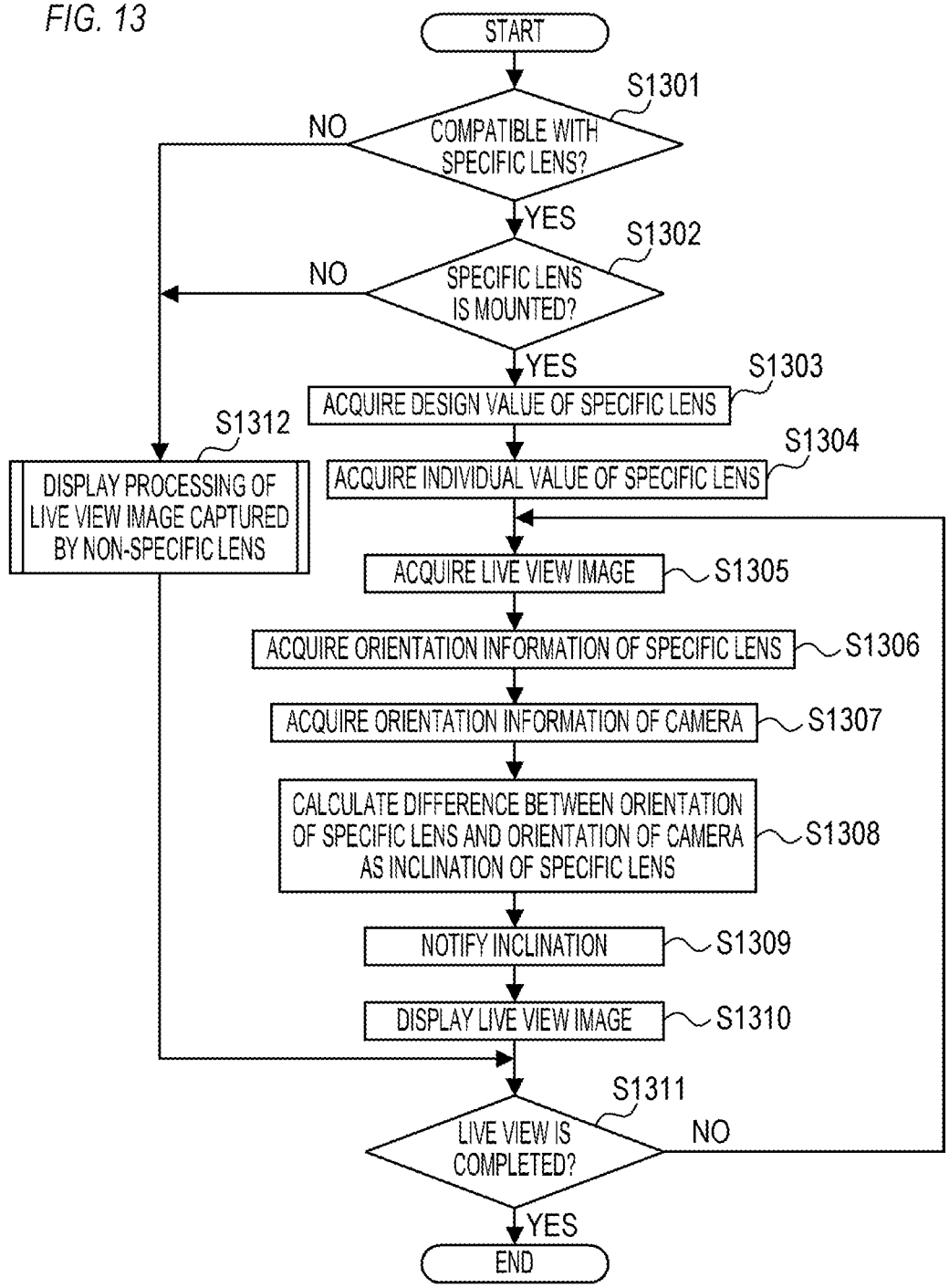
FIG. 13 is a flowchart showing operations of a camera according to Embodiment 3.

FIG. 13 is a flowchart showing an example of operations of the camera 100 according to Embodiment 3. These operations are implemented by loading a program recorded in the nonvolatile memory 219 into the system memory 218 and executing the program by the system control unit 50. For example, when the camera 100 is started, the operations of FIG. 13 are started. The operation of FIG. 13 is an operation of displaying the live view image captured by the imaging unit 211 on the EVF 217 or the display unit 108. The operations of FIG. 13 are performed when the camera 100 is in a shooting standby state.

In step S1301, the system control unit 50 determines whether the camera 100 is compatible with a specific lens unit. Here, the specific lens unit is a lens unit that can detect an orientation, and is, for example, the lens unit 300 in FIG. 12. If it is determined that the version is compatible with the specific lens unit, the processing proceeds to step S1302, but otherwise the processing proceeds to step S1312. The determination method is similar to step S601 in FIG. 6.

In step S1302, the system control unit 50 determines whether the specific lens unit is mounted to the camera 100. If it is determined that the specific lens unit is mounted, the processing proceeds to step S1303, but otherwise the processing proceeds to step S1312. If the specific lens unit is newly mounted from a state in which the specific lens unit is not mounted, the processing also proceeds to step S1303. In a case where the specific lens unit is detached from a state in which the specific lens unit is mounted and a lens unit (non-specific lens unit) different from the specific lens unit is mounted, the processing proceeds to step S1312. The determination method is similar to step S602 in FIG. 6.

In step S1303, the system control unit 50 acquires, from the mounted (connected) specific lens unit, design values of the specific lens unit. The acquisition method is similar to step S603 in FIG. 6.

In step S1304, the system control unit 50 acquires, from the mounted (connected) specific lens unit, individual values of the specific lens unit. The acquisition method is similar to step S604 in FIG. 6.

In step S1305, the system control unit 50 acquires a live view image from the imaging unit 211. The acquisition method is similar to step S605 in FIG. 6.

In step S1306, the system control unit 50 acquires information on the orientation (for example, an inclination angle of the specific lens unit with respect to the ground) of the mounted (connected) specific lens unit from an orientation detection unit (for example, orientation detection unit 1201 in FIG. 12) of the specific lens unit. Note that the processing in step S1306 may be processing of acquiring intra-lens accelerometer information from the design value acquired in step S1003.

In step S1307, the system control unit 50 acquires the orientation of the camera 100 (for example, the inclination angle of the camera 100 with respect to the ground) from the orientation detection unit 222 of the camera 100.

Figure 14:
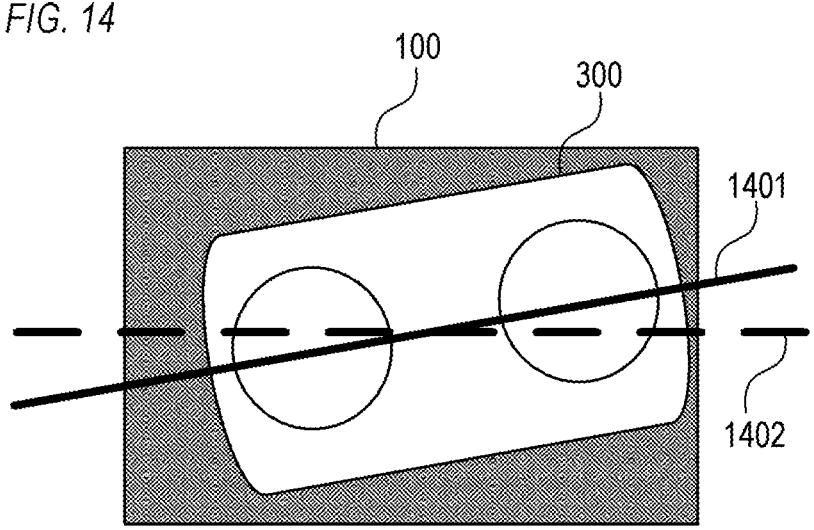
FIG. 14 is a schematic diagram illustrating a method of calculating an inclination according to Embodiment 3.

In step S1308, the system control unit 50 calculates a difference between the orientation (inclination angle) of the specific lens unit acquired in step S1306 and the orientation (inclination angle) of the camera 100 acquired in step S1307. This difference corresponds to the magnitude (angle) of the inclination of the specific lens unit with respect to the imaging unit 211. For example, an angle between straight lines 1401 and 1402 in FIG. 14 is calculated. The straight line 1401 indicates the horizontal direction of the lens unit 300 and corresponds to the orientation of the lens unit 300. The straight line 1402 indicates the horizontal direction of the camera 100 and corresponds to the orientation of the camera 100.

In step S1309, the system control unit 50 notifies the user of the inclination calculated in step S1308. The notification method is similar to step S611 in FIG. 6.

In step S1310, the system control unit 50 displays the live view image acquired in step S1305 on the EVF 217 or the display unit 108. The display method is similar to step S612 in FIG. 6.

In step S1311, the system control unit 50 determines whether to end the live view display. In a case where the system control unit determines to end the live view display, the operation of FIG. 13 is ended, and otherwise, the processing proceeds to step S1305. The determination method is similar to step S613 in FIG. 6.

When a non-specific lens unit is mounted to the camera 100, the processing in step S1312 is performed. In step S1312, the system control unit 50 displays the live view image captured by the non-specific lens unit on the EVF 217 or the display unit 108. The processing of step S1312 is identical to processing in the related art of displaying a live view image, and thus detailed description thereof is omitted. When the processing of step S1312 ends, the operation of FIG. 13 ends.

According to Embodiment 3, in a case where a lens unit that can detect an orientation is mounted as a specific lens unit to the imaging apparatus, an effect similar to that of Embodiment 1 can be obtained.

Embodiment 4

In Embodiments 1 to 3, an example is described in which the inclination of the lens unit with respect to the image sensor is detected and notified to the user. However, since the inclination of the lens unit with respect to the image sensor is minute, even if the inclination is notified as it is, the user cannot easily determine whether the inclination is large (whether the inclination is to be reduced). In Embodiment 4, an example is described in which the inclination of the lens unit with respect to the image sensor is exaggerated (emphasized) and notified. Hereinafter, description of the same points as those of Embodiment 1 (for example, the same configuration and processing as those of Embodiment 1) is appropriately omitted.

Figure 15:
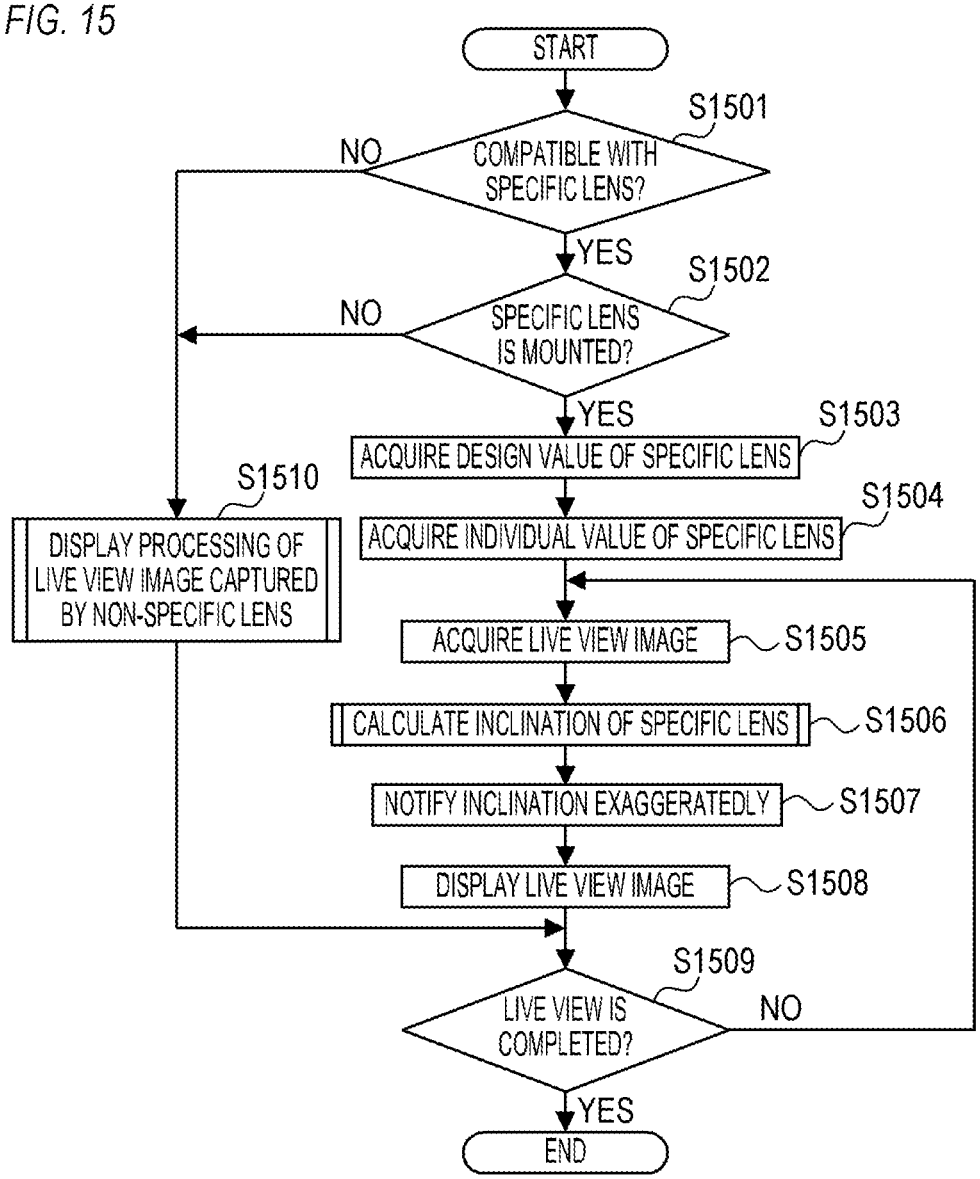
FIG. 15 is a flowchart showing operations of a camera according to Embodiment 4.

FIG. 15 is a flowchart showing an example of the operations of the camera 100 according to Embodiment 4. These operations are implemented by loading a program recorded in the nonvolatile memory 219 into the system memory 218 and executing the program by the system control unit 50. For example, when the camera 100 is started, the operations of FIG. 15 are started. The operation of FIG. 15 is an operation of displaying the live view image captured by the imaging unit 211 on the EVF 217 or the display unit 108. The operations of FIG. 15 are performed in a case where the camera 100 is in a shooting standby state.

In step S1501, the system control unit 50 determines whether the camera 100 is compatible with the specific lens unit. If it is determined that the version is compatible with the specific lens unit, the processing proceeds to step S1502, but otherwise the processing proceeds to step S1510. The determination method is similar to step S601 in FIG. 6.

In step S1502, the system control unit 50 determines whether the specific lens unit is mounted to the camera 100. If it is determined that the specific lens unit is mounted, the processing proceeds to step S1503, but otherwise the processing proceeds to step S1510. Note that, if the specific lens unit is newly mounted from a state in which the specific lens unit is not mounted, the processing also proceeds to step S1503. In a case where the specific lens unit is detached from a state in which the specific lens unit is mounted and a lens unit (non-specific lens unit) different from the specific lens unit is mounted, the processing proceeds to step S1510. The determination method is similar to step S602 in FIG. 6.

In step S1503, the system control unit 50 acquires, from the mounted (connected) specific lens unit, design values of the specific lens unit. The acquisition method is similar to step S603 in FIG. 6.

In step S1504, the system control unit 50 acquires, from the mounted (connected) specific lens unit mounted, individual values of the specific lens unit. The acquisition method is similar to step S604 in FIG. 6.

In step S1505, the system control unit 50 acquires a live view image from the imaging unit 211. The acquisition method is similar to step S605 in FIG. 6.

In step S1506, the system control unit 50 calculates the inclination of the specific lens unit with respect to the imaging unit 211 (image sensor). The calculation of the inclination is performed by any one or a plurality of methods of Embodiments 1 to 3, and the inclination is calculated by the same processing as the adopted processing in Embodiments 1 to 3.

In step S1507, the system control unit 50 exaggeratedly notifies the user of the inclination calculated in step S1506. Details of the notification method are described below.

In step S1508, the system control unit 50 displays the live view image acquired in step S1505 on the EVF 217 or the display unit 108. The display method is similar to step S612 in FIG. 6.

In step S1509, the system control unit 50 determines whether to end the live view display. In a case where the system control unit determines to end the live view display, the operation of FIG. 15 is ended, and otherwise, the processing proceeds to step S1505. The determination method is similar to step S613 in FIG. 6.

When a non-specific lens unit is mounted to the camera 100, the processing in step S1510 is performed. In step S1510, the system control unit 50 displays the live view image captured by the non-specific lens unit on the EVF 217 or the display unit 108. The processing of step S1510 is identical to processing in the related art of displaying a live view image, and thus detailed description thereof is omitted. When the processing of step S1510 ends, the operation of FIG. 15 ends.

A method of exaggeratedly notifying the inclination of the lens unit with respect to the image sensor is described with reference to FIGS. 16A and 16B. Here, it is assumed that the notification is performed by display on the EVF 217 or the display unit 108.

Figure 16A:
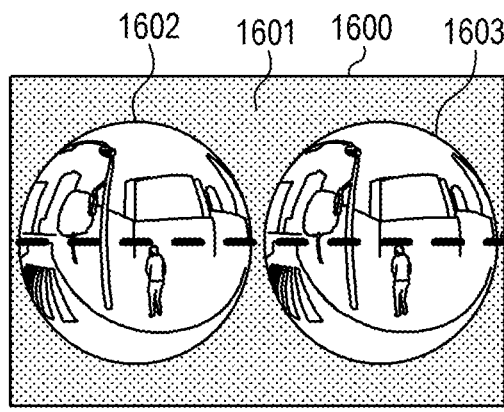
FIGS. 16A through 16H are schematic diagrams illustrating a method of notifying an inclination according to Embodiment 4.

FIG. 16A illustrates an example of a screen in an ideal state in which the lens unit is not inclined with respect to the image sensor. On a screen 1600 (live view screen) in FIG. 16A, an invalid area 1601 outside an image circle and effective areas 1602 and 1603 each of which is the image circle are displayed. Furthermore, a horizontal line 1604 indicating the horizontal direction of the image sensor is displayed. Note that the horizontal line 1604 may not be displayed.

Figure 16B:
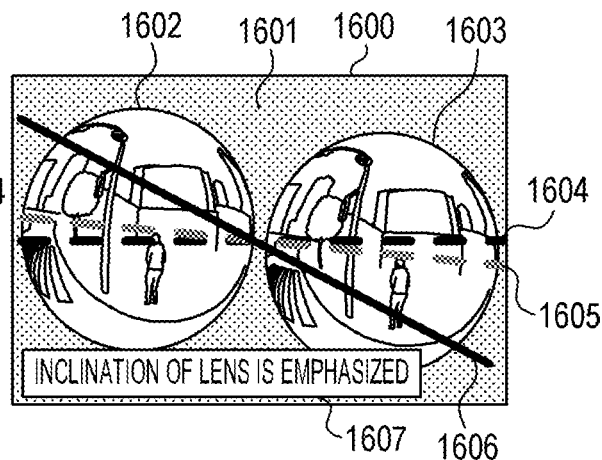

FIG. 16B illustrates an example of a screen in a state in which the lens unit is inclined with respect to the image sensor. In FIG. 16B, as in FIG. 16A, the invalid area 1601, the effective areas 1602 and 1603, and the horizontal line 1604 are displayed on the screen 1600.

In FIG. 16B, a straight line 1605 is a straight line inclined at the actual inclination of the lens unit with respect to the image sensor, and is, for example, a straight line passing through the center of the effective area 1602 and the center of the effective area 1603. Since the angle between the horizontal line 1604 and the straight line 1605, that is, the inclination of the lens unit with respect to the image sensor is minute, even if the straight line 1605 is displayed, the user cannot easily determine whether the inclination is large (whether the inclination is to be reduced).

Therefore, in FIG. 16B, a straight line 1606 tilted more than the actual inclination of the lens unit with respect to the image sensor is displayed. For example, the straight line 1606 is displayed such that the inclination of the straight line 1606 (the angle between the horizontal line 1604 and the straight line 1606) is N (N>1) times the inclination of the straight line 1605 (the angle between the horizontal line 1604 and the straight line 1605). A magnification N may be a value determined in advance at the time of manufacturing the lens unit or the camera 100 or may be a value designated by the user. By viewing the straight line 1606, the user can easily determine whether the inclination of the lens unit with respect to the image sensor is large (whether the inclination is to be reduced).

Furthermore, in FIG. 16B, the user is notified also that the inclination of the lens unit with respect to the image sensor is exaggerated (emphasized) by the display of a message 1607. The message 1607 indicates that the inclination of the lens unit with respect to the image sensor is exaggeratedly displayed.

As described above, according to Embodiment 4, the inclination of the lens unit with respect to the image sensor is exaggeratedly notified, so that the user can easily determine whether the inclination is large (whether the inclination is to be reduced).

Note that, also by the display as illustrated in FIGS. 16C to 16H, the user can easily determine whether the inclination of the lens unit with respect to the image sensor is large (whether the inclination is to be reduced).

Figure 16C:
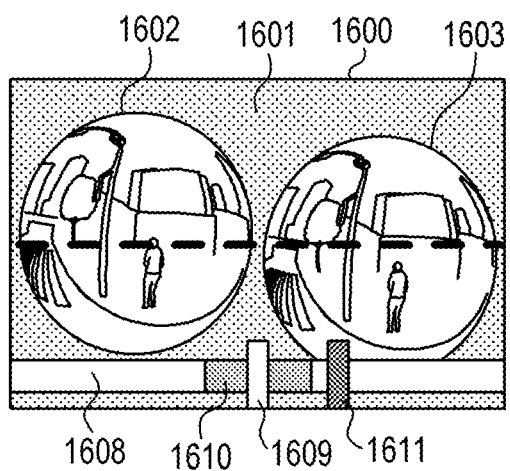
Figure 16D:
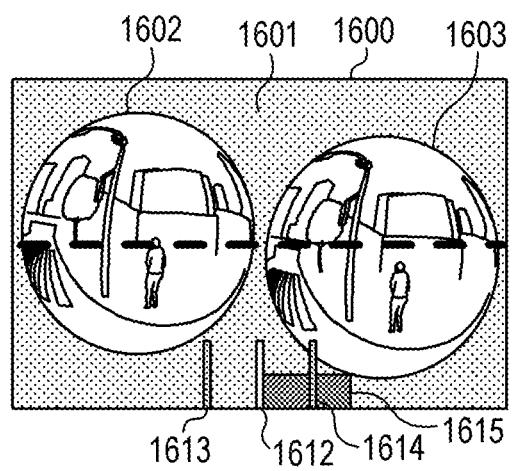

FIGS. 16C and 16D illustrate an example of a screen for displaying a bar indicating the inclination of the lens unit with respect to the image sensor. In FIGS. 16C and 16D, as in FIG. 16A, the invalid area 1601, and the effective areas 1602 and 1603 are displayed on the screen 1600.

A bar 1608 is displayed on the screen 1600 of FIG. 16C. A plurality of positions in the longitudinal direction (left-to-right direction in FIG. 16C) of the bar 1608 corresponds to a plurality of inclinations of the lens unit with respect to the image sensor. In FIG. 16C, the center position of the bar 1608 in the left-to-right direction corresponds to a state where the lens unit is not inclined with respect to the image sensor, and an item 1609 is displayed at the center position. The distance from the center position of the bar 1608 in the left-to-right direction corresponds to the magnitude of the inclination of the lens unit with respect to the image sensor (the longer the distance, the larger the inclination). The position of the bar 1608 on the right side from the center position in the left-to-right direction corresponds to a state in which the lens unit is inclined rightward with respect to the image sensor, and the position of the bar 1608 on the left side from the center position in the left-to-right direction corresponds to a state in which the lens unit is inclined leftward with respect to the image sensor.

In FIG. 16C, an area 1610 of the bar 1608 indicates an allowable range of the inclination of the lens unit with respect to the image sensor. The area 1610 is displayed in an identifiable manner by coloring the bar 1608 or the like. By notifying the allowable range, the user can easily determine whether the inclination of the lens unit with respect to the image sensor is large (whether the inclination is to be reduced). Note that the information of the allowable range may be stored in advance in a storage unit (for example, the nonvolatile memory 219) of the camera 100 or may be acquired from the lens unit mounted to the camera 100.

In FIG. 16C, an item 1611 is displayed at the position of the bar 1608 corresponding to the current inclination of the lens unit with respect to the image sensor. In FIG. 16C, since the item 1611 is displayed on the right side of the item 1609, the user can easily grasp that the lens unit is mounted to be inclined to the right. In addition, since the item 1611 is displayed outside the area 1610, the user can easily grasp that the inclination of the lens unit exceeds the allowable range.

Items 1612 to 1614 are displayed on the screen 1600 of FIG. 16D. The position of the item 1612 corresponds to a state in which the lens unit is not inclined with respect to the image sensor. The distance from the item 1612 in a predetermined direction (the left-to-right direction in FIG. 16D) corresponds to the magnitude of the inclination of the lens unit with respect to the image sensor (the longer the distance, the larger the inclination). The position on the right side of the item 1612 corresponds to a state in which the lens unit is inclined rightward with respect to the image sensor, and the position on the left side of the item 1612 corresponds to a state in which the lens unit is inclined leftward with respect to the image sensor. The positions of the items 1613 and 1614 correspond to the limit value of the allowable range of the inclination of the lens unit with respect to the image sensor. The item 1613 indicates a limit value (maximum value) of allowable leftward inclination, and the item 1614 indicates a limit value (maximum value) of allowable rightward inclination.

A bar 1615 extending from the item 1612 is also displayed on the screen 1600 of FIG. 16D. The length of the bar 1615 in the left-to-right direction corresponds to the magnitude of the current inclination of the lens unit with respect to the image sensor (the longer the distance, the larger the inclination). A state in which the bar 1615 extends rightward from the item 1612 corresponds to a state in which the lens unit is inclined rightward with respect to the image sensor, and a state in which the bar 1615 extends leftward from the item 1612 corresponds to a state in which the lens unit is inclined leftward with respect to the image sensor. In FIG. 16D, since the bar 1615 extends rightward from the item 1612, the user can easily grasp that the lens unit is mounted to be inclined to the right. In addition, since the right end of the bar 1615 (the end on the side opposite to the side of the item 1612) exceeds the item 1614, the user can easily grasp that the inclination of the lens unit exceeds the allowable range.

Figure 16E:
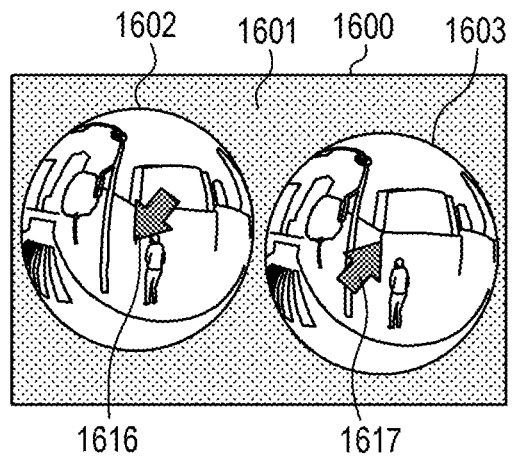
Figure 16F:
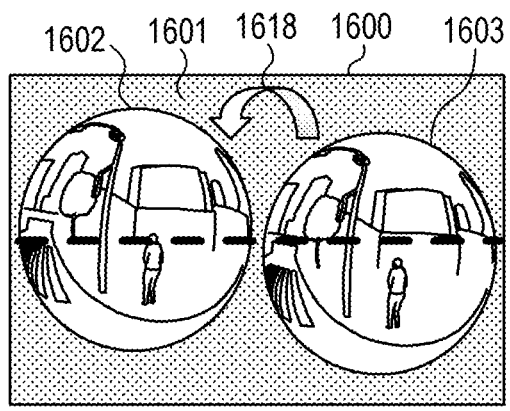

FIGS. 16E and 16F illustrate an example of a screen that displays an arrow in a direction in accordance with the inclination of the lens unit with respect to the image sensor. In FIGS. 16E and 16F, as in FIG. 16A, the invalid area 1601, and the effective areas 1602 and 1603 are displayed on the screen 1600. The display of the arrow can prompt the user to adjust the lens. The size of the arrow may change according to the magnitude of the inclination of the lens unit.

Two arrows 1616 and 1617 are displayed on the screen 1600 of FIG. 16E. The arrows 1616 and 1617 indicate a rotation direction of the lens unit for eliminating the inclination of the lens unit. The direction of the arrow 1616 displayed in superposition with the effective area 1602 can also be interpreted as the moving direction of the effective area 1602 when the inclination of the lens unit is eliminated. The direction of the arrow 1617 displayed in superposition with the effective area 1603 can also be interpreted as the moving direction of the effective area 1603 when the inclination of the lens unit is eliminated. One curved arrow 1618 is displayed on the screen 1600 of FIG. 16F. The arrow 1618 indicates a rotation direction of the lens unit for eliminating the inclination of the lens unit. An arrow indicating a direction in which the lens unit is inclined may be displayed.

Figure 16G:
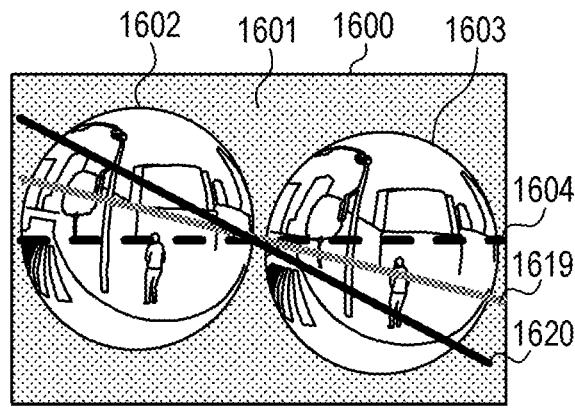
Figure 16H:
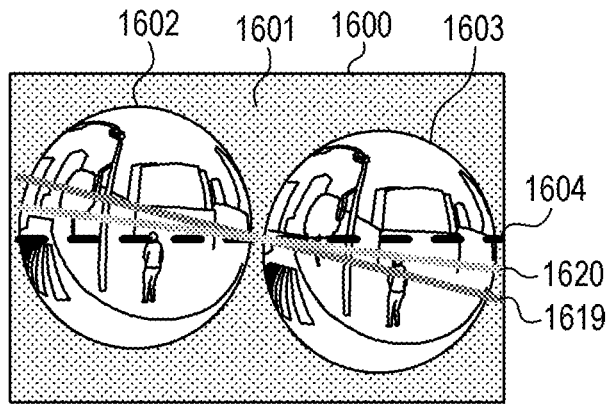

FIGS. 16G and 16H illustrate an example of a screen for notifying an allowable range of the inclination of the lens unit with respect to the image sensor. In FIGS. 16G and 16H, as in FIG. 16A, the invalid area 1601, the effective areas 1602 and 1603, and the horizontal line 1604 are displayed on the screen 1600.

Straight lines 1619 and 1620 are displayed on the screen 1600 of FIGS. 16G and 16H. The inclination of the straight line 1619 is the limit value of the allowable range of the inclination of the lens unit with respect to the image sensor.

The inclination of the straight line 1620 is the current inclination of the lens unit with respect to the image sensor. The inclination of the straight line 1619 and the inclination of the straight line 1620 are displayed as exaggerated inclinations. The user can easily grasp whether the inclination of the lens unit exceeds the allowable range by viewing the straight lines 1619 and 1620. In FIG. 16G, since the inclination of the straight line 1620 is larger than the inclination of the straight line 1619, it is possible to easily grasp that the inclination of the lens unit exceeds the allowable range. In FIG. 16H, since the inclination of the straight line 1620 is smaller than the inclination of the straight line 1619, it is possible to easily grasp that the inclination of the lens unit is within the allowable range.

Note that, as the limit value of the allowable range of the inclination of the lens unit with respect to the image sensor, there are two limit values including an allowable limit value (maximum value) of the leftward inclination and an allowable limit value (maximum value) of the rightward inclination. Two straight lines corresponding to the two limit values may be displayed as the straight line indicating the limit value, but only the straight line indicating the limit value corresponding to the current inclination direction of the lens unit may be displayed as the straight line indicating the limit value in order to simplify the screen. In FIGS. 16G and 16H, since the lens unit is inclined rightward with respect to the image sensor, only the straight line 1619 indicating the limit value of the allowable rightward inclination is displayed.

In addition, whether the inclination of the lens unit is within the allowable range may be notified by changing a form (for example color, luminance, or line type) of the straight line 1620 between a case where the inclination of the lens unit with respect to the image sensor is within the allowable range and a case where the inclination is not within the allowable range. In other notification methods of the inclination of the lens unit with respect to the image sensor, the allowable range may be notified, or whether the inclination of the lens unit is within the allowable range may be notified. When notifying whether the inclination of the lens unit is within the allowable range, the allowable range itself may not be notified.

The various kinds of control described to be performed by the system control unit 50 may be performed by a piece of hardware, or processing may be shared among a plurality of pieces of hardware (for example, a plurality of processors or circuits) to control the entire apparatus.

Although the embodiments of the present invention are described in detail, the present invention is not limited by these specific embodiments, and various forms in the range without departing from the gist of the invention shall also be encompassed by the present invention. Each of the above-described embodiments merely illustrates an embodiment of the present invention, and the embodiments can be combined as necessary.

Furthermore, in the above-described embodiment, a case where the present invention is applied to a digital camera is described as an example, but the present invention is not limited to this example, and can be applied to any imaging apparatus as long as a lens is attachable to and detachable from the imaging apparatus. For example, the present invention is applicable to a personal computer, a PDA, a mobile-phone terminal, a portable image viewer, a printer apparatus, a digital photo frame, a music player, a video game machine, and an electronic book reader. The present invention is further applicable to, for example, a video player, a display device (including a projector), a tablet terminal, a smartphone, an AI speaker, a home electrical appliance, and an on-vehicle apparatus.

According to the present invention, a user can easily grasp whether image quality degradation due to positional displacement between two images acquired by using two optical systems can be reduced by adjustment, and further the user can suitably perform adjustment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-068316, filed on Apr. 19, 2023, which is hereby incorporated by reference herein in its entirety.

What is claimed is:

1. An imaging apparatus comprising:
an image sensor;
a processor; and
a memory storing a program which, when executed by the processor, causes the imaging apparatus to
acquire inclination information that is information of inclination of a dual-lens circular fish-eye lens unit with respect to the image sensor by analyzing a third image including a first circular fish-eye image area and a second circular fish-eye image area formed on the image sensor via two circular fish-eye lenses in the dual-lens circular fish-eye lens unit in a case where the dual-lens circular fish-eye lens unit is mounted to the imaging apparatus; and
perform control to notify the inclination of the dual-lens circular fish-eye lens unit with respect to the image sensor based on the acquired inclination information.

2. The imaging apparatus according to claim 1, wherein
two positions respectively corresponding to two optical axis centers of the two circular fish-eye lenses are detected from the third image, and the inclination information is acquired by calculating an angle between a straight line passing through the two positions and a predetermined direction in the third image.

3. The imaging apparatus according to claim 1, wherein
the dual-lens circular fish-eye lens unit is capable of projecting light indicating a predetermined direction in the dual-lens circular fish-eye lens unit onto the image sensor, and
a portion corresponding to the light is detected from the third image, and the inclination information is acquired based on the portion.

4. The imaging apparatus according to claim 1, wherein,
when the program is executed by the processor, the program further causes the imaging apparatus to acquire information on a manufacturing error of the dual-lens circular fish-eye lens unit, and
the inclination information is acquired in consideration of the manufacturing error of the dual-lens circular fish-eye lens unit.

5. The imaging apparatus according to claim 1, wherein
the control is performed to exaggeratedly notify the inclination of the dual-lens circular fish-eye lens unit with respect to the image sensor.

6. The imaging apparatus according to claim 1, wherein
the control is performed to display an item inclined at an inclination greater than the inclination of the dual-lens circular fish-eye lens unit with respect to the image sensor.

7. The imaging apparatus according to claim 6, wherein
the control is performed to further notify that the inclination of the dual-lens circular fish-eye lens unit with respect to the image sensor is exaggerated.

8. The imaging apparatus according to claim 1, wherein
the control is performed to display a bar indicating the inclination of the dual-lens circular fish-eye lens unit with respect to the image sensor.

9. The imaging apparatus according to claim 1, wherein
the control is performed to display an arrow in a direction in accordance with the inclination of the dual-lens circular fish-eye lens unit with respect to the image sensor.

10. The imaging apparatus according to claim 1, wherein
the control is performed to further notify whether the inclination of the dual-lens circular fish-eye lens unit with respect to the image sensor is within an allowable range.

11. The imaging apparatus according to claim 1, wherein
the control is performed to further notify an allowable range of the inclination of the dual-lens circular fish-eye lens unit with respect to the image sensor.

12. The imaging apparatus according to claim 11, further comprising:
a storage in which information of the allowable range is stored in advance.

13. The imaging apparatus according to claim 11, wherein,
when the program is executed by the processor, the program further causes the imaging apparatus to acquire information on the allowable range from the dual-lens circular fish-eye lens unit.

14. A control method of an imaging apparatus, comprising:
acquiring inclination information that is information of inclination of a dual-lens circular fish-eye lens unit with respect to an image sensor of the imaging apparatus by analyzing a third image including a first circular fish-eye image area and a second circular fish-eye image area formed on the image sensor via two circular fish-eye lenses in the dual-lens circular fish-eye lens unit in a case where the dual-lens circular fish-eye lens unit is mounted to the imaging apparatus; and
performing control to notify the inclination of the dual-lens circular fish-eye lens unit with respect to the image sensor based on the acquired inclination information.

15. A non-transitory computer readable medium that stores a program, wherein the program causes a computer to execute a control method of an imaging apparatus, the control method comprising:
acquiring inclination information that is information of inclination of a dual-lens circular fish-eye lens unit with respect to an image sensor of the imaging apparatus by analyzing a third image including a first circular fish-eye image area and a second circular fish-eye image area formed on the image sensor via two circular fish-eye lenses in the dual-lens circular fish-eye lens unit in a case where the dual-lens circular fish-eye lens unit is mounted to the imaging apparatus; and
performing control to notify the inclination of the dual-lens circular fish-eye lens unit with respect to the image sensor based on the acquired inclination information.

* * * * *